US008528016B2

(12) United States Patent
Aldrey et al.

(10) Patent No.: US 8,528,016 B2
(45) Date of Patent: Sep. 3, 2013

(54) DYNAMIC PROGRAM GUIDE INFORMATION

(75) Inventors: Raul Aldrey, Dallas, TX (US); Shafiq Kassam, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 894 days.

(21) Appl. No.: 12/647,877

(22) Filed: Dec. 28, 2009

(65) Prior Publication Data

US 2011/0162008 A1   Jun. 30, 2011

(51) Int. Cl.
*H04N 5/445* (2011.01)
*H04N 7/173* (2011.01)

(52) U.S. Cl.
USPC .............................................. 725/40; 725/117

(58) Field of Classification Search
USPC .................................................... 725/40, 117
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |

(Continued)

*Primary Examiner* — Pankaj Kumar
*Assistant Examiner* — Franklin Andramuno

(57) ABSTRACT

A set-top box may receive program guide information from a server. The program guide information may identify a group of programs and specify, for each program, an indicator of set-top boxes tuned to the each program or providing the each program. The set-top box may further provide, to a display and using the received program guide information, a program guide, where the program guide represents each program, in the group of programs, as a shape, and where a size of each shape corresponds to the indicator of set-top boxes tuned to the represented program or providing the represented program. The set-top box may also receive updated program guide information from the server and dynamically increase or decrease at least one shape in the program guide, based on the updated program guide information.

22 Claims, 21 Drawing Sheets

(56) References Cited

U.S. PATENT DOCUMENTS

| | | | |
|---|---|---|---|
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,973,691 A * | 10/1999 | Servan-Schreiber | 715/803 |
| 5,974,222 A | 10/1999 | Yuen et al. | |
| 5,982,369 A * | 11/1999 | Sciammarella et al. | 715/835 |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,016,141 A | 1/2000 | Knudson et al. | |
| 6,028,599 A | 2/2000 | Yuen et al. | |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,133,909 A | 10/2000 | Schein et al. | |
| 6,137,950 A | 10/2000 | Yuen | |
| 6,144,401 A | 11/2000 | Casement et al. | |
| 6,151,059 A | 11/2000 | Schein et al. | |
| 6,167,188 A | 12/2000 | Young et al. | |
| 6,177,931 B1 | 1/2001 | Alexander et al. | |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 | 7/2001 | Allison et al. | |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,388,714 B1 | 5/2002 | Schein et al. | |
| 6,396,546 B1 | 5/2002 | Alten et al. | |
| 6,412,110 B1 | 6/2002 | Schein et al. | |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,498,895 B2 | 12/2002 | Young et al. | |
| 6,505,348 B1 | 1/2003 | Knowles et al. | |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,588,013 B1 | 7/2003 | Lumley et al. | |
| 6,668,133 B2 | 12/2003 | Yuen et al. | |
| 6,687,906 B1 | 2/2004 | Yuen et al. | |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,756,997 B1 | 6/2004 | Ward et al. | |
| 6,760,537 B2 | 7/2004 | Mankovitz | |
| 6,799,326 B2 | 9/2004 | Boylan et al. | |
| 6,799,327 B1 | 9/2004 | Reynolds et al. | |
| 6,801,261 B1 * | 10/2004 | Haynes | 348/553 |
| 6,850,693 B2 | 2/2005 | Young et al. | |
| 6,859,799 B1 | 2/2005 | Yuen | |
| 7,039,935 B2 | 5/2006 | Knudson et al. | |
| 7,069,576 B1 | 6/2006 | Knudson et al. | |
| 7,139,983 B2 * | 11/2006 | Kelts | 715/802 |
| 7,469,413 B1 * | 12/2008 | Mizutome et al. | 725/48 |
| 7,487,529 B1 | 2/2009 | Orlick | |
| 7,703,041 B2 * | 4/2010 | Ito et al. | 715/804 |
| 7,873,972 B2 * | 1/2011 | Zaslavsky et al. | 725/41 |
| 2001/0029610 A1 | 10/2001 | Corvin et al. | |
| 2001/0047298 A1 | 11/2001 | Moore et al. | |
| 2001/0054181 A1 | 12/2001 | Corvin | |
| 2002/0073424 A1 | 6/2002 | Ward et al. | |
| 2002/0112237 A1 * | 8/2002 | Kelts | 725/39 |
| 2002/0124255 A1 | 9/2002 | Reichardt et al. | |
| 2003/0005445 A1 | 1/2003 | Schein et al. | |
| 2003/0056219 A1 | 3/2003 | Reichardt et al. | |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |
| 2003/0208756 A1 | 11/2003 | Macrae et al. | |
| 2004/0010806 A1 | 1/2004 | Yuen et al. | |
| 2004/0045025 A1 | 3/2004 | Ward et al. | |
| 2004/0107437 A1 | 6/2004 | Reichardt et al. | |
| 2004/0131076 A1 * | 7/2004 | Smith | 370/432 |
| 2004/0168189 A1 | 8/2004 | Reynolds et al. | |
| 2004/0194138 A1 | 9/2004 | Boylan et al. | |
| 2004/0261098 A1 | 12/2004 | Macrae et al. | |
| 2005/0010949 A1 | 1/2005 | Ward et al. | |
| 2005/0028201 A1 | 2/2005 | Klosterman et al. | |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0160456 A1 * | 7/2005 | Moskowitz | 725/45 |
| 2005/0216936 A1 | 9/2005 | Knudson et al. | |
| 2005/0251824 A1 | 11/2005 | Thomas et al. | |
| 2006/0039481 A1 * | 2/2006 | Shen et al. | 375/240.25 |
| 2006/0117337 A1 * | 6/2006 | Shivaji Rao et al. | 725/25 |
| 2006/0156336 A1 | 7/2006 | Knudson et al. | |
| 2006/0171752 A1 * | 8/2006 | Tanaka et al. | 400/62 |
| 2006/0212894 A1 | 9/2006 | Knudson et al. | |
| 2006/0277574 A1 | 12/2006 | Schein et al. | |
| 2006/0288366 A1 | 12/2006 | Boylan et al. | |
| 2007/0016926 A1 | 1/2007 | Ward et al. | |
| 2007/0033613 A1 | 2/2007 | Ward et al. | |
| 2007/0083824 A1 * | 4/2007 | Yun et al. | 715/788 |
| 2007/0107010 A1 | 5/2007 | Jolna et al. | |
| 2009/0049490 A1 * | 2/2009 | White | 725/100 |
| 2009/0083798 A1 * | 3/2009 | Lee | 725/46 |
| 2009/0178081 A1 * | 7/2009 | Goldenberg et al. | 725/46 |
| 2009/0208191 A1 * | 8/2009 | Imai et al. | 386/126 |
| 2010/0192181 A1 * | 7/2010 | Friedman | 725/44 |

* cited by examiner

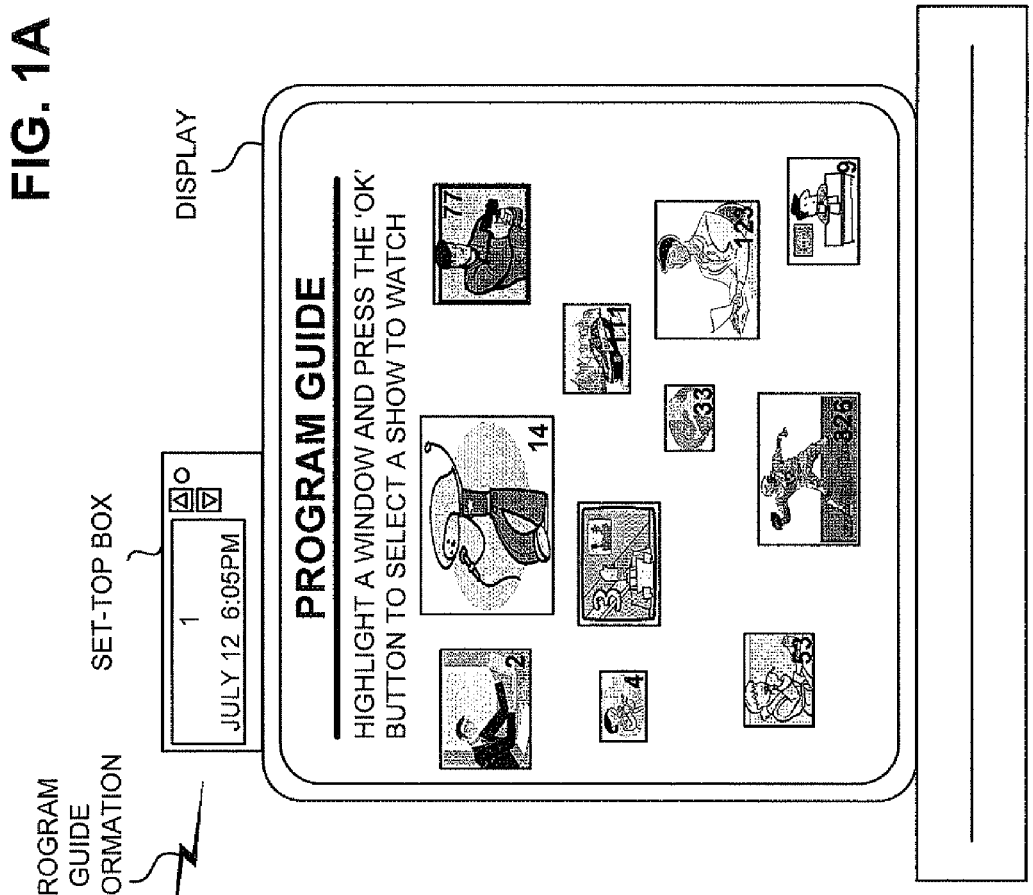
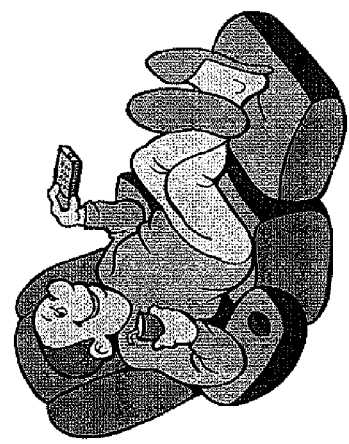
FIG. 1A

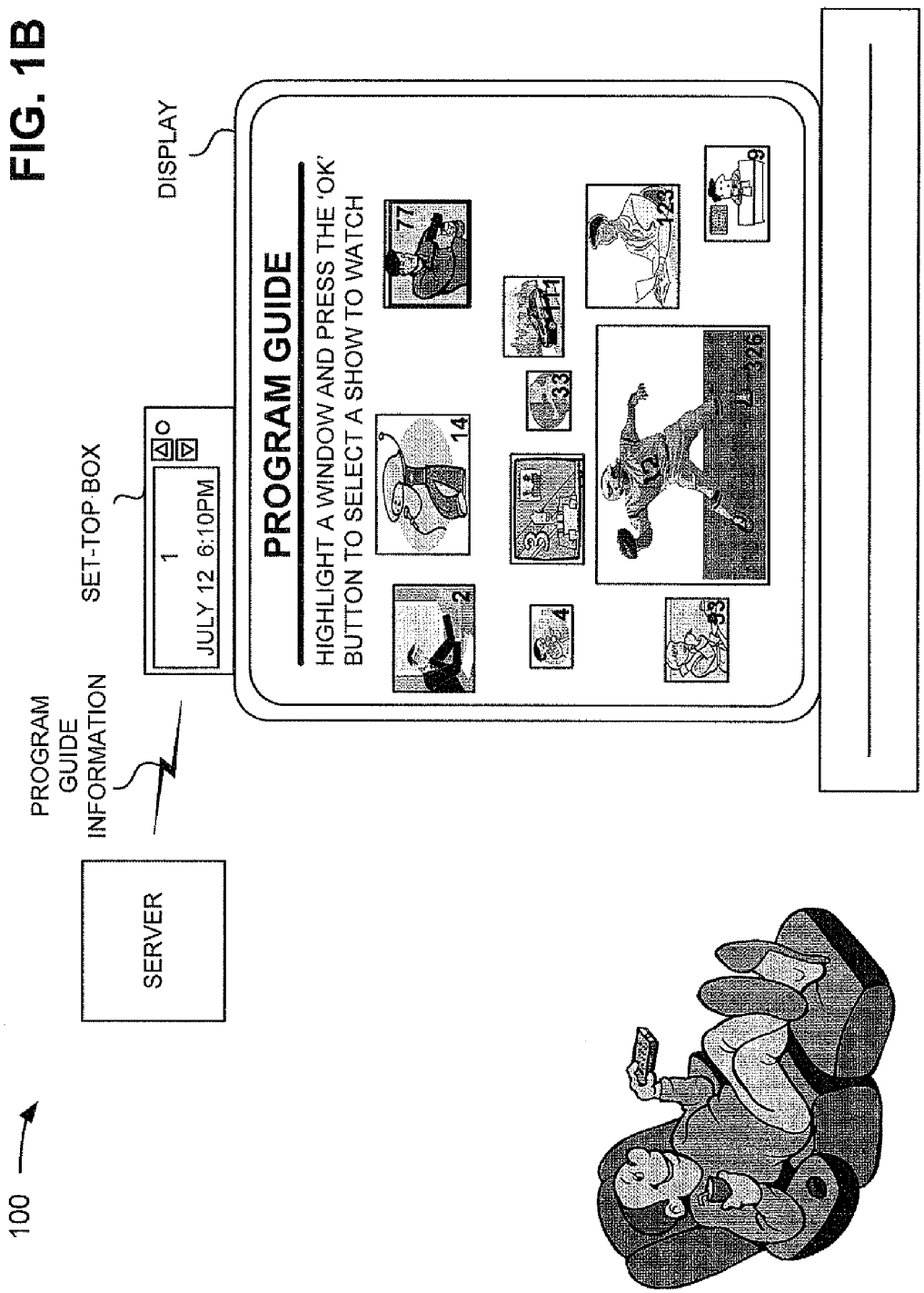

| TIME PD 510 | CATEGORY 520 | GRAPHICAL LAYOUT 530 | SHAPE 540 | NO 550 |
|---|---|---|---|---|
| | | SOURCE CATEGORY | | |
| WEEKENDS | ALL | | RANDOM | 15 |
| WEEKDAYS, BETWEEN 7 PM AND 12 AM | SPORTS | LOCATION | CIRCLE | 10 |
| WEEKDAYS, BETWEEN 7 AM AND 5 PM | LIVE TV | SIDEBAR | RECTANGLE | 20 |
| ... | | | | |
| TIME PD | CATEGORY | LAYOUT | SHAPE | NO |

| PROGRAM ID 810 | QUANTITY 820 | IMAGE 830 | METADATA 840 | OTHER 850 |
|---|---|---|---|---|
| ID | QUANTITY | IMAGE | METADATA | OTHER |
| ID | QUANTITY | IMAGE | METADATA | OTHER |
| ID | QUANTITY | IMAGE | METADATA | OTHER |
| ID | QUANTITY | IMAGE | METADATA | OTHER |
| ... | ... | ... | ... | ... |
| ID | QUANTITY | IMAGE | METADATA | OTHER |

FIG. 8

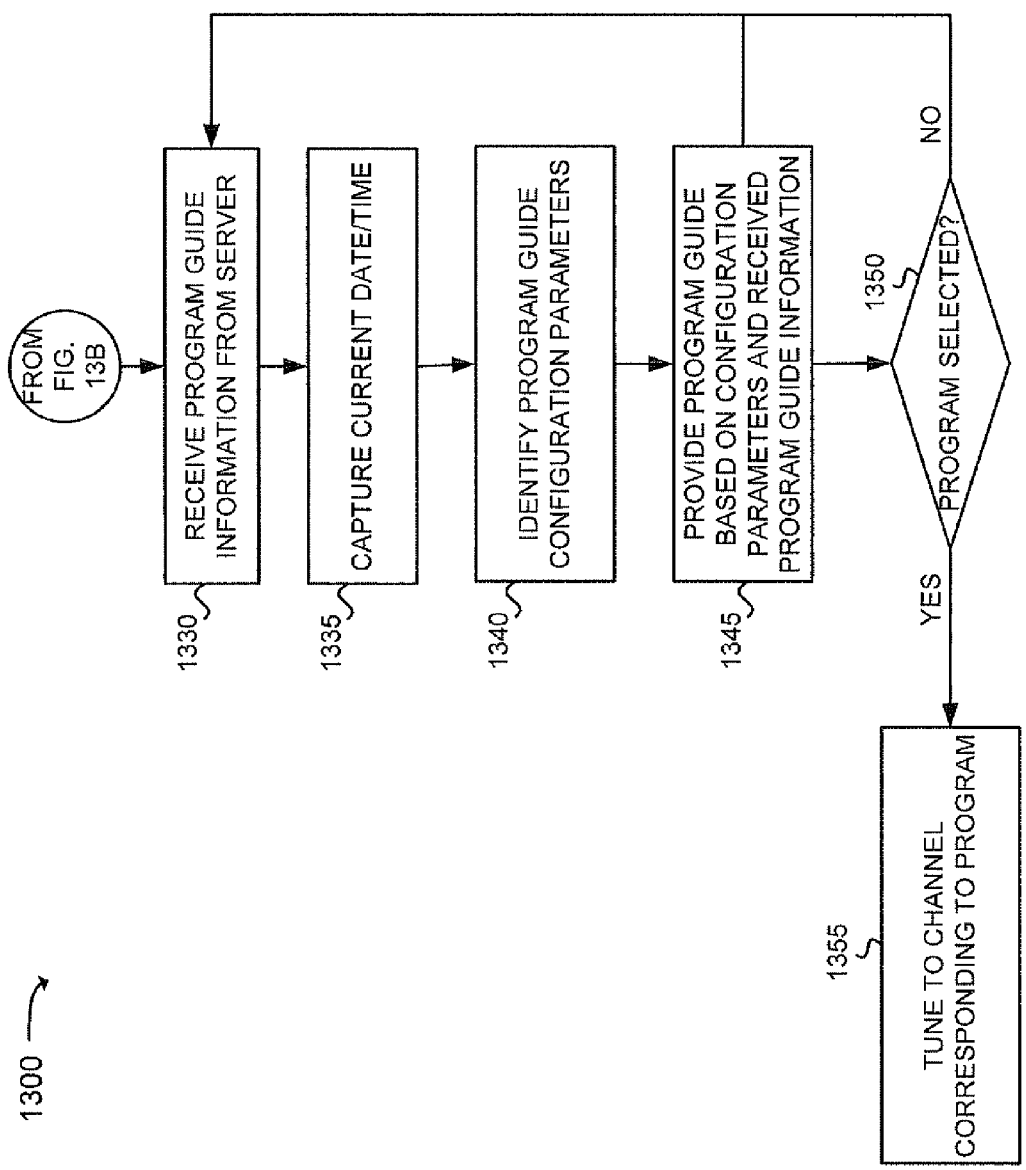

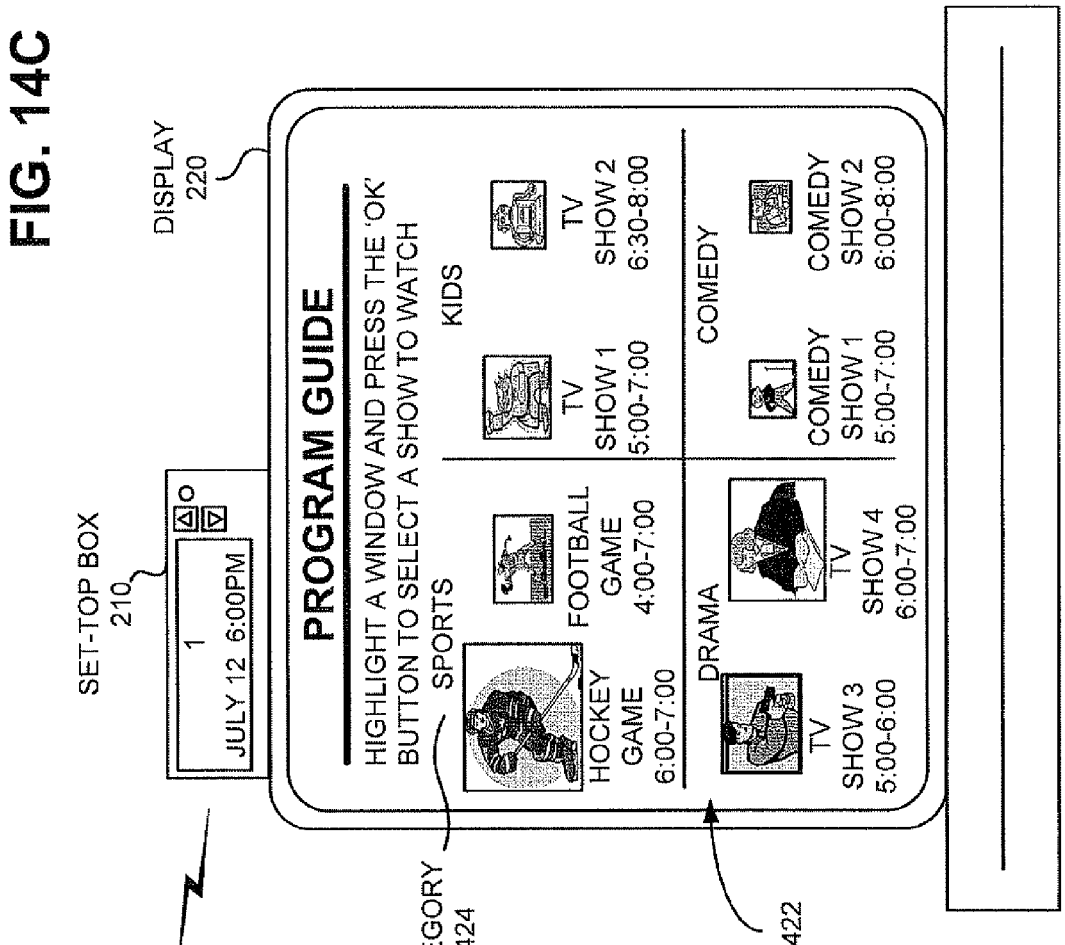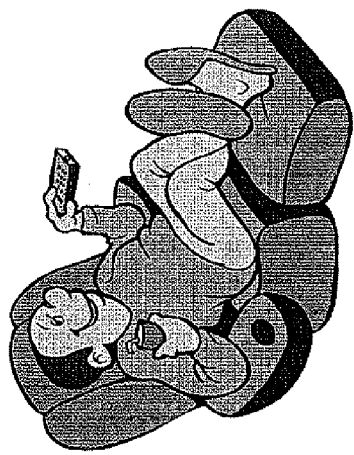
FIG. 14C

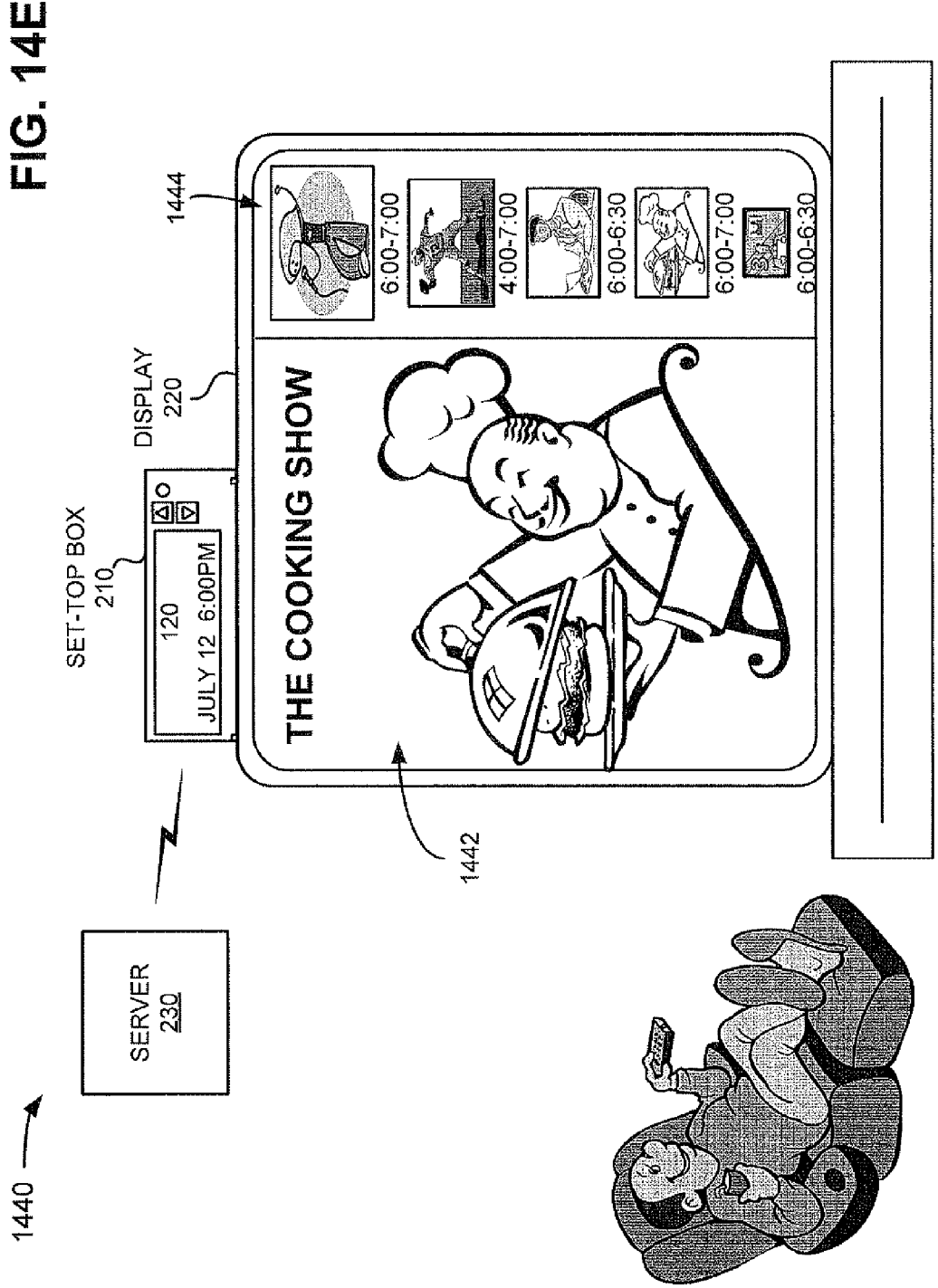

DYNAMIC PROGRAM GUIDE INFORMATION

BACKGROUND INFORMATION

Television distribution systems, such as fiber optic networks, cable networks, and satellite networks, provide users with a large number of television programs. In some instances, television distribution systems may provide a program guide that lists the times and channels that programs are available for viewing via the television distribution systems. A user may interact with the program guide to determine when programs are airing for instant viewing and/or recording.

BRIEF DESCRIPTION OF THE DRAWINGS

FIGS. 1A and 1B are exemplary diagrams illustrating a concept described herein;

FIG. 5 is a portion of an exemplary computer-readable medium that may be associated with the set-top box of FIG. 2;

FIG. 8 is an exemplary database that may be associated with the server of FIG. 2;

FIGS. 13A-13C is a flow chart of an exemplary process for providing a dynamic program guide; and FIGS. 14A-14E are exemplary ways in which the dynamic program guide may be provided.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

FIGS. 1A and 1B are exemplary diagrams illustrating a concept 100 described herein. As illustrated, a set-top box may be associated with a display and a server. The server may receive information from the set-top box relating to the program to which the set-top box is currently tuned. The server may accumulate this information with information from other set-top boxes to obtain, in real time, information regarding the popularity of the programs to which set-top boxes are currently tuned or that are currently being provided by set-top boxes. The popularity of a program may correspond to the quantity of set-top boxes currently tuned to the program or currently providing the program (e.g., to a display) as compared to the quantity of set-top boxes currently tuned to other programs or currently providing the other programs. The server may provide the popularity information, in real time, to the set-top box for use as part of a program guide. For example, as illustrated in FIG. 1A, the set-top box may receive program guide information from the server and may cause the program guide information to be presented to the user. In one embodiment, the program guide information may be presented in a manner that depicts, to the user, the current popularity of the programs being displayed. For example, as illustrated in FIG. 1A, the program on channel "14" is currently the most popular (since the size of the rectangle in which the program is displayed is bigger than all of the other displayed shapes).

The server may continue to accumulate information regarding the current popularity of programs and transmit this information to the set-top box, allowing the user to know, in real time, the popularity of programs to which set-top boxes are currently tuned or that are currently being provided by set-top boxes. As an example and with reference to FIG. 1B, the popularity of the football game on channel "326" has become the most popular. If, upon seeing that the football game has become the most popular, the user wants to see why the football game has become so popular, the user may use, for example, a remote control to select the football game. As a result, the set-top box may become tuned to the channel corresponding to the football game.

The word "program" as used herein is to be broadly construed as any type of video content that can be provided from a set-top box to a display. For example, a program may correspond to live television programming (meaning that the programming is currently airing on a television channel), video-on-demand programming, pay-per-view programming, user generated content, programming recorded via a digital video recorder, and/or other types of video content.

Figure 2:
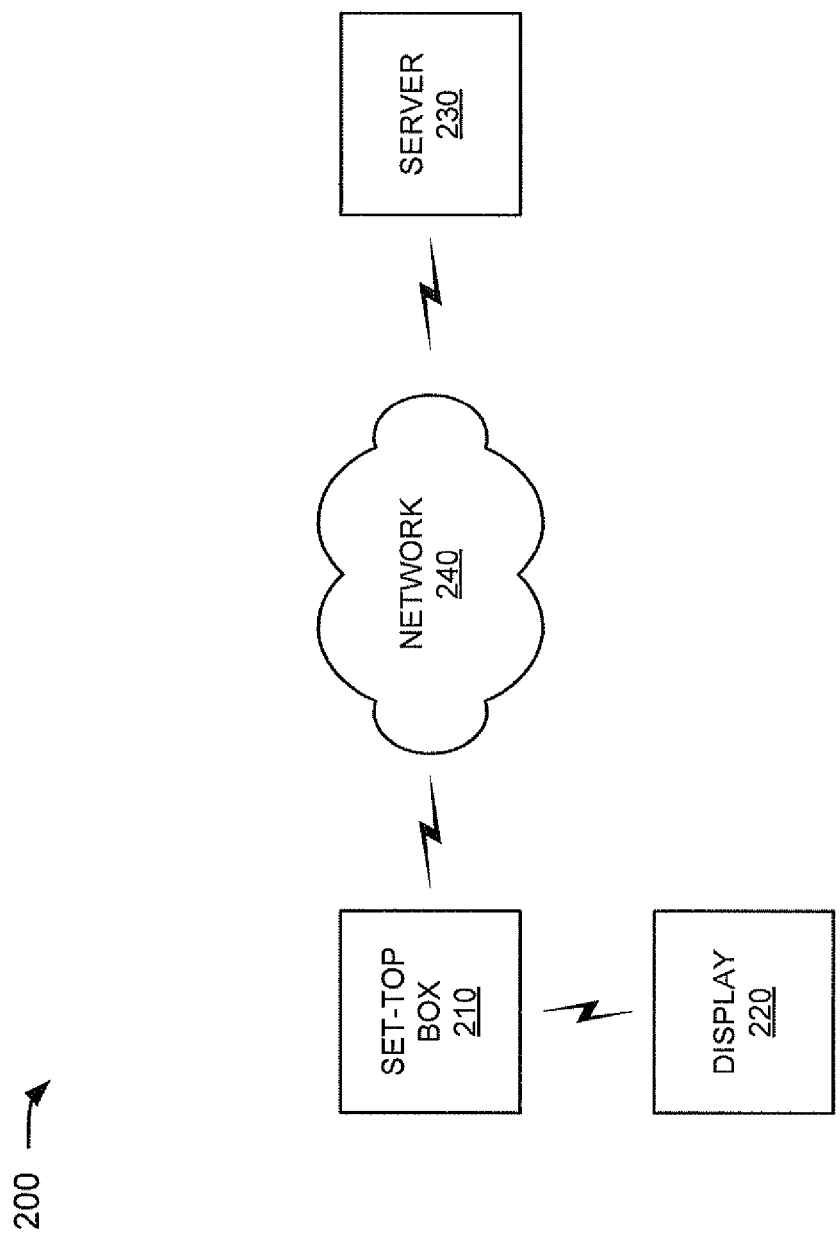
FIG. 2 is an exemplary network in which systems and/or methods described herein may be implemented.

FIG. 2 is an exemplary network 200 in which systems and/or methods described herein may be implemented. As illustrated, network 200 may include a set-top box 210, a display 220, a server 230, and a network 240.

Set-top box 210 may include one or more devices that provide programs to display 220. Set-top box 210 may allow a user to alter the program provided to display 220 based on a signal (e.g., a channel up or channel down signal) from, for example, a remote control (not shown). In addition, set-top box 210 may provide a program guide to display 220. In one embodiment, set-top box 210 may further send program information, such as information identifying a program being provided by set-top box 210, to server 230. Additionally, or alternatively, set-top box 210 may receive program guide information from server 230 and provide a program guide, based on that information, to display 220. Set-top box 210 may, in some embodiments, include a digital video recorder or another type of recorder that may record a program. In another embodiment, set-top box 210 may be associated with an external digital video recorder or another type of recorder, such as a video cassette recorder, or an external storage device. Set-top box 210 may connect to network 240 and display 220 via a wired and/or wireless connection.

Display 220 may include any type of display that is capable of displaying programs. Display 220 may be implemented as a stand-alone device and/or may be integrated into another device.

Server 230 may include one or more devices that receive program information from set-top boxes, accumulate the program information, and provide program guide information to set-top boxes. Server 230 may accumulate program information for each program for which program information has been received. Server 230 may connect to network 240 via a wired and/or wireless connection.

Network 240 may include one or more networks of any type, including a television network (such as a cable television network or a fiber optic television network), a Public Land Mobile Network (PLMN), a Public Switched Telephone Network (PSTN), a local area network (LAN), a metropolitan area network (MAN), a wide area network (WAN), a private network, the Internet, an intranet, and/or another type of network.

Although FIG. 2 shows exemplary components of network 100, in other embodiments, network 100 may include fewer, different, differently arranged, or additional components than depicted in FIG. 2. For example, network 100 may include a content provider that provides programming (such as television programming) to set-top box 210. Additionally, or alternatively, one or more components of network 100 may perform the tasks described as being performed by one or more other components of network 100.

Figure 3:
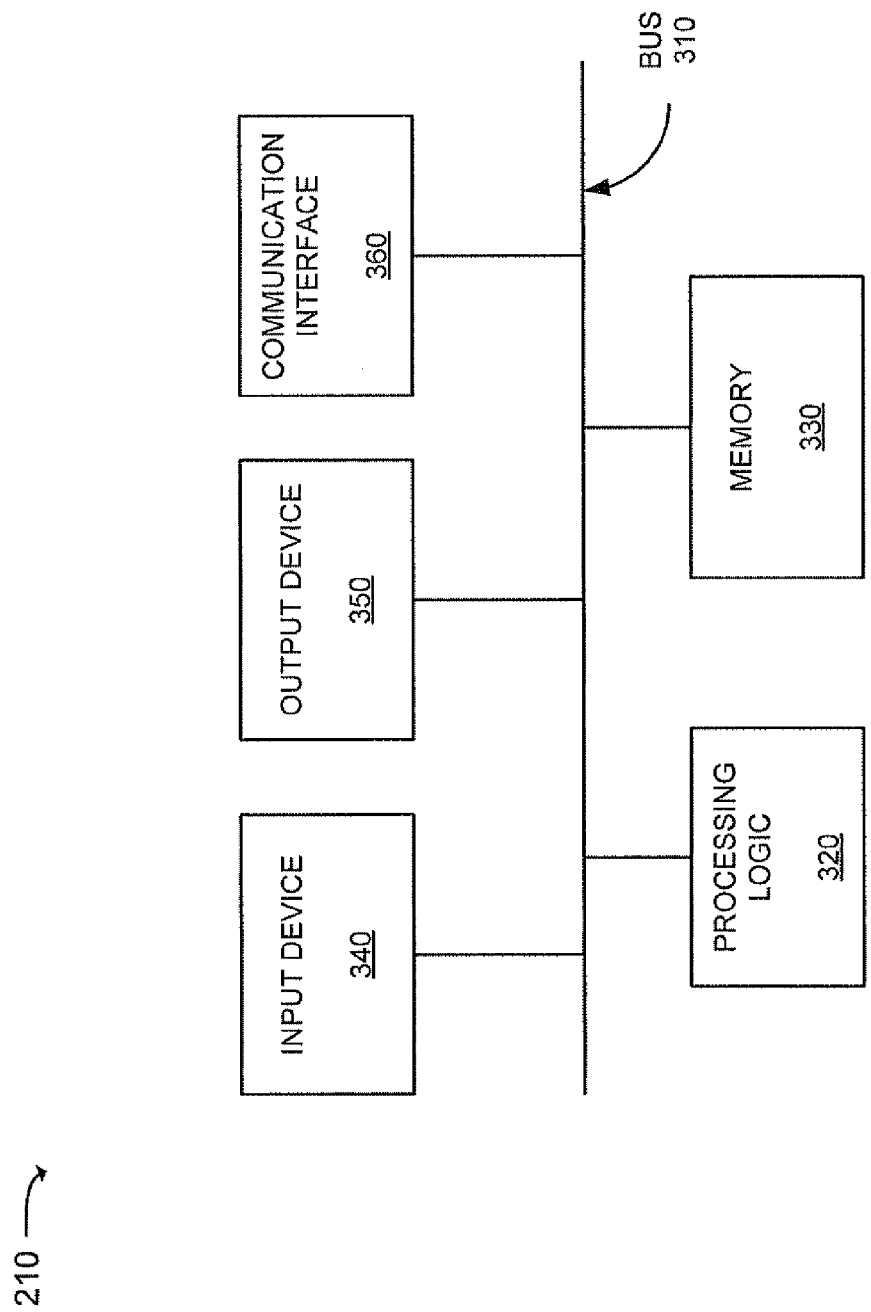
FIG. 3 is a diagram of exemplary components of the set-top box of FIG. 2.

FIG. 3 is a diagram of exemplary components of set-top box 210. As illustrated, set-top box 210 may include a bus 310, processing logic 320, a memory 330, an input device 340, an output device 350, and a communication interface 360.

Bus 310 may include a path that permits communication among the elements of set-top box 210. Processing logic 320 may include one or more processors, microprocessors, or other types of processing logic, such as one or more application specific integrated circuits (ASICs), field programmable gate arrays (FPGAs), etc., that may interpret and execute instructions. Memory 330 may include a random access memory (RAM) or another type of dynamic storage device that may store information and instructions for execution by processing logic 320, read only memory (ROM) or another type of static storage device that may store static information and instructions for use by processing logic 320, and/or another type of storage device.

Input device 340 may include a mechanism that permits an operator to input information to set-top box 210, such as buttons or a touch-screen interface. Output device 350 may include a mechanism that outputs information to the operator, such as a display. Communication interface 360 may include any transceiver-like mechanism that enables set-top box 210 to receive and/or send information from/to other devices and/or systems, such as display 220, server 230, a remote control, one or more entertainment components (e.g., a speaker, a video recorder, etc.), etc.

As will be described in detail below, set-top box 210 may perform certain operations. Set-top box 210 may perform these and other operations, in response to processing logic 320 executing software instructions contained in a computer-readable medium, such as memory 330. A computer-readable medium may be defined as one or more physical and/or logical memory devices. A logical memory device may include a space within a single physical memory device or spread across multiple physical memory devices.

The software instructions may be read into memory 330 from another computer-readable medium or from another device via communication interface 360. The software instructions contained in memory 330 may cause processing logic 320 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Although FIG. 3 shows exemplary components of set-top box 210, in other embodiments, set-top box 210 may include fewer, different, differently arranged, or additional components than depicted in FIG. 3. Additionally, or alternatively, one or more components of set-top box 210 may perform the tasks described as being performed by one or more other components of set-top box 210.

Figure 4:
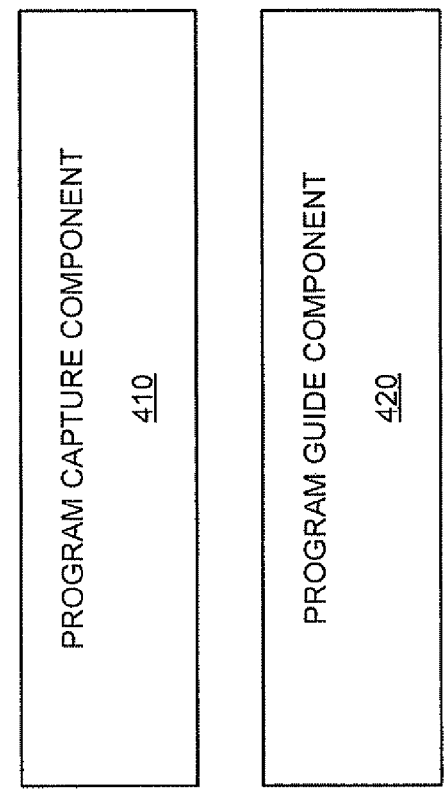
FIG. 4 is a diagram of exemplary functional components of the set-top box of FIG. 2.

FIG. 4 is a diagram of exemplary functional components of set-top box 210. As illustrated, set-top box 210 may include a program capture component 410 and a program guide component 420.

Program capture component 410 may include one or more components that capture program information, in response to detection of a trigger, and provide the program information to server 230. The program information may include, for example, information identifying a program to which set-top box 210 is currently tuned or that is currently being provided by set-top box 210 to display 220. The identification information may include a code that identifies the program and identifies the source from where the program originates (e.g., a television channel, pay-per-view, video-on-demand, digital video recorder, etc.). The trigger may correspond to set-top box 210 initiating the provisioning of a program. For example, set-top box 210 may capture and transmit program information to server 230 when the user tunes set-top box 210 to a new channel, when the user initiates the playing of a pay-per-view program, when the user initiates the playing of a video-on-demand program, when the user initiates the playing of a recorded program, and/or in response to other events.

Program guide component 420 may include one or more components that allow the user to configure a set of parameters that define how programs are displayed on a program guide and which programs are to be displayed. As an example, the parameters may indicate a time period, a category of a program, a layout defining a manner in which the program guide is to be displayed, a shape in which programs are to be represented in the program guide, a number of programs that are to be provided in the program guide, and/or other parameters. Program guide component 420 may store the user-defined parameters and use these parameters for providing a program guide to the user.

Although FIG. 4 shows exemplary functional components of set-top box 210, in other embodiments, set-top box 210 may include fewer, different, differently arranged, or additional components than depicted in FIG. 4. Additionally, or alternatively, one or more functional components of set-top box 210 may perform the tasks described as being performed by one or more other functional components of set-top box 210.

FIG. 5 is a portion of an exemplary computer-readable medium 500 that may be associated with set-top box 210. Additionally or alternatively, computer-readable medium 500 may be associated with another device, such as a server. While one computer-readable medium is described below, it will be appreciated that computer-readable medium 500 may include multiple computer-readable media stored locally at set-top box 210, or stored at one or more different and possibly remote locations.

As illustrated, computer-readable medium 500 may maintain a group of entries in the following exemplary fields: a time period (PD) field 510, a category field 520, a graphical layout field 530, a shape field 540, and a number (NO) field 550.

Time period field 510 may store a time period for which a particular program guide configuration is to be provided. The time period may include, for example, a date, a date range, one or more days of a week, a range of time, and/or some other quantity of time. In one embodiment, the time period may be user-specified. In some embodiments, no time period may be provided in time period field 510, which may cause the same program guide configuration to be provided in response to all triggers.

Category field 520 may store one or more program categories. For example, the program categories may include known categories, such as a movies category, a children's category, an educational category, a news category, a sports category, a drama category, a comedy category, etc.

Graphical layout field 530 may store information defining a manner in which the program guide is to be displayed. For example, graphical layout field 530 may store information identifying that the program guide is to be separated into program categories, information identifying that the program guide is to be separated into source categories, information identifying that the program guide is to be separated based on defined geographic locations of the set-top boxes that are tuned to the programs or providing the programs, information identifying a location on display 220 at which the program guide is to be displayed, and/or information identifying other manners in which the program guide is to be displayed.

When the program guide is to be separated into program categories, the program categories may include known categories, such as movies, children's, educational, news, sports, dramas, comedies, etc. When the program guide is to be separated into source categories, the source categories may include a live television category, a pay-per-view category, a video-on-demand category, a digital video recorder category, a user generated content category, and/or other types of source categories. When the program guide is to be separated by geographic locations, one or more geographic regions may be specified, such as states, cities, zip codes, towns, etc. The manner in which the program guide is to be displayed may include display in a sidebar of display 220, display in a bar on the top, side, or bottom of display 220, or display in other locations on display 220.

Shape field 540 may store information indicating a shape in which programs are to be represented in the program guide. For example, the shape may include a random shape, a circular shape, a rectangular shape, or other types of shapes. In some embodiments, a default shape (e.g., a rectangular shape) may be provided when no shape is specified by the user.

Number field 550 may store information indicating the total number of programs to be simultaneously provided in the program guide on display 220. For example, a set of configuration parameters may specify that 10, 15, or 20 of the highest ranking programs are to be simultaneously provided, where the highest ranking programs are determined based on the quantity of set-top boxes currently tuned to the programs or currently providing the programs. Alternatively, number field may, when the program guide is to be separated by categories or geographic locations, store a value indicating the total number of programs to be provided for each category or geographic location. A default number of simultaneous programs may be provided when no number of simultaneous programs is specified by the user.

As one example of a set of configuration parameters for a program guide, as illustrated in FIG. 5, a user specified that during the weekends, 15 programs in all categories are to be simultaneously represented in the program guide as random shapes, and that the programs are to be separated by a source with which the programs are associated (e.g., one or more of a live television category, a pay-per-view category, a video-on-demand category, a digital video recorder category, a user generated content category, or other types of categories). As a further example, the user has also specified that during weekdays, between the hours of 7 PM and 12 AM, 10 sports programs are to be simultaneously represented in the program guide as circles, and that the programs are to be separated by defined geographic locations identified by the user. As one additional example, the user has specified that during weekdays, between the hours of 7 AM and 5 PM, 20 live telephone programs are to be simultaneously represented in the program guide as rectangles, and that the programs are to be displayed in a sidebar on display 220.

Although FIG. 5 shows exemplary fields of computer-readable medium 500, in other embodiments, computer-readable medium 500 may include fewer, different, differently arranged, or additional fields than depicted in FIG. 5.

Figure 6:
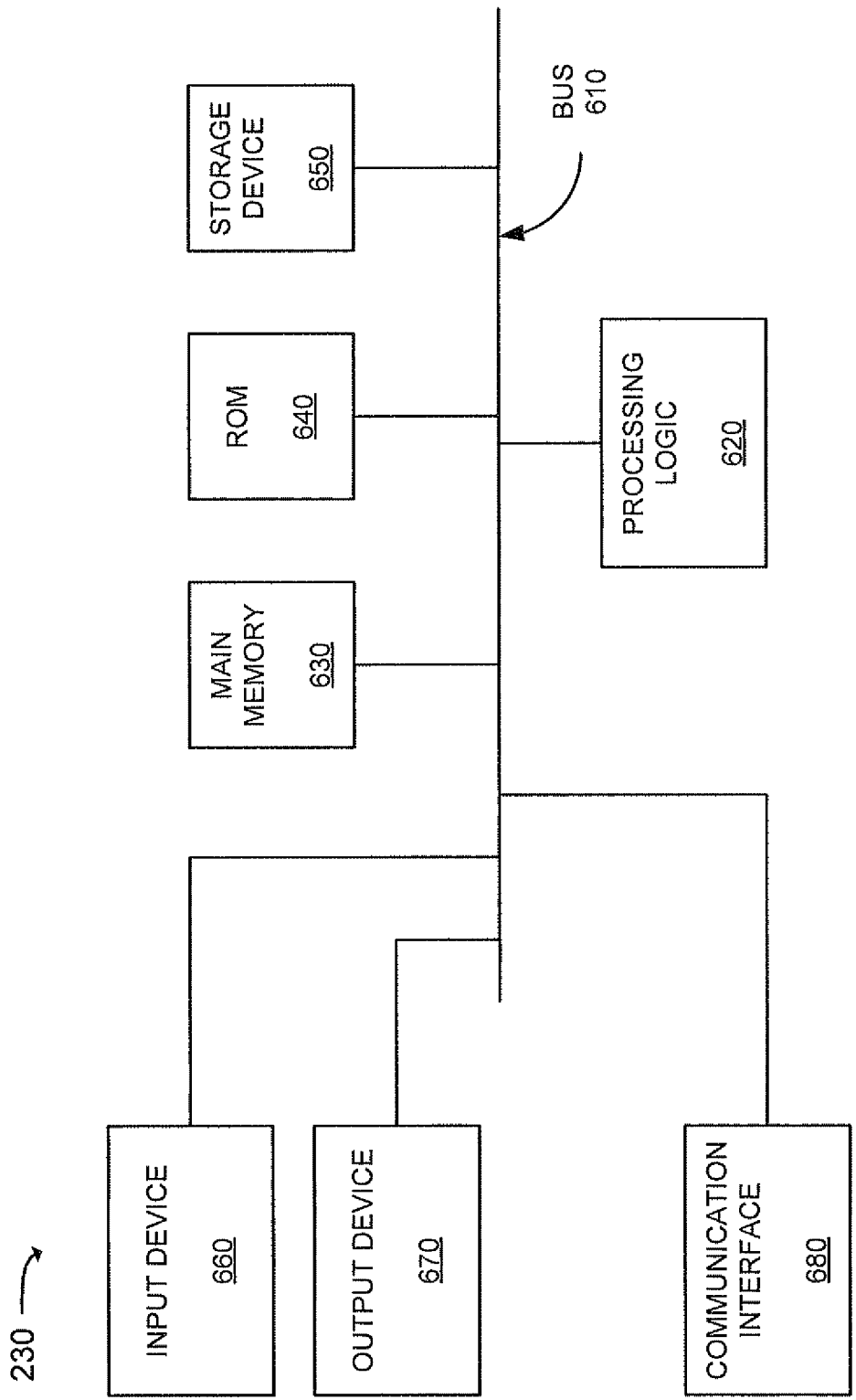
FIG. 6 is a diagram of exemplary components of a server of FIG. 2.

FIG. 6 is a diagram of exemplary components of server 230. As illustrated, server 230 may include a bus 610, processing logic 620, a main memory 630, a ROM 640, a storage device 650, an input device 660, an output device 670, and a communication interface 680.

Bus 610 may include a path that permits communication among the elements of server 230. Processing logic 620 may include one or more processors, microprocessors, or other type of processing logic, such as one or more ASICs, one or more FPGAs, etc., that may interpret and execute instructions. Main memory 630 may include a RAM or another type of dynamic storage device that may store information and instructions for execution by processing logic 620. ROM 640 may include a ROM device or another type of static storage device that may store static information and instructions for use by processing logic 620. Storage device 650 may include a magnetic and/or optical recording medium and its corresponding drive.

Input device 660 may include a mechanism that permits an operator to input information to server 230, such as buttons or a touch-screen interface. Output device 670 may include a mechanism that outputs information to the operator, such as a display. Communication interface 680 may include any transceiver-like mechanism that enables server 230 to receive and/or send information from/to other devices and/or systems, such as set-top box 210.

As will be described in detail below, server 230 may perform certain operations. Server 230 may perform these and other operations in response to processing logic 620 executing software instructions contained in a computer-readable medium, such as main memory 630. The software instructions may be read into main memory 630 from another computer-readable medium or from another device via communication interface 680. The software instructions contained in main memory 630 may cause processing logic 620 to perform processes that will be described later. Alternatively, hard-wired circuitry may be used in place of, or in combination with, software instructions to implement processes consistent with exemplary embodiments. Thus, embodiments described herein are not limited to any specific combination of hardware circuitry and software.

Although FIG. 6 shows exemplary components of server 230, in other embodiments, server 230 may include fewer, different, differently arranged, or additional components than depicted in FIG. 6. Additionally, or alternatively, one or more components of server 230 may perform the tasks described as being performed by one or more other components of server 230.

Figure 7:
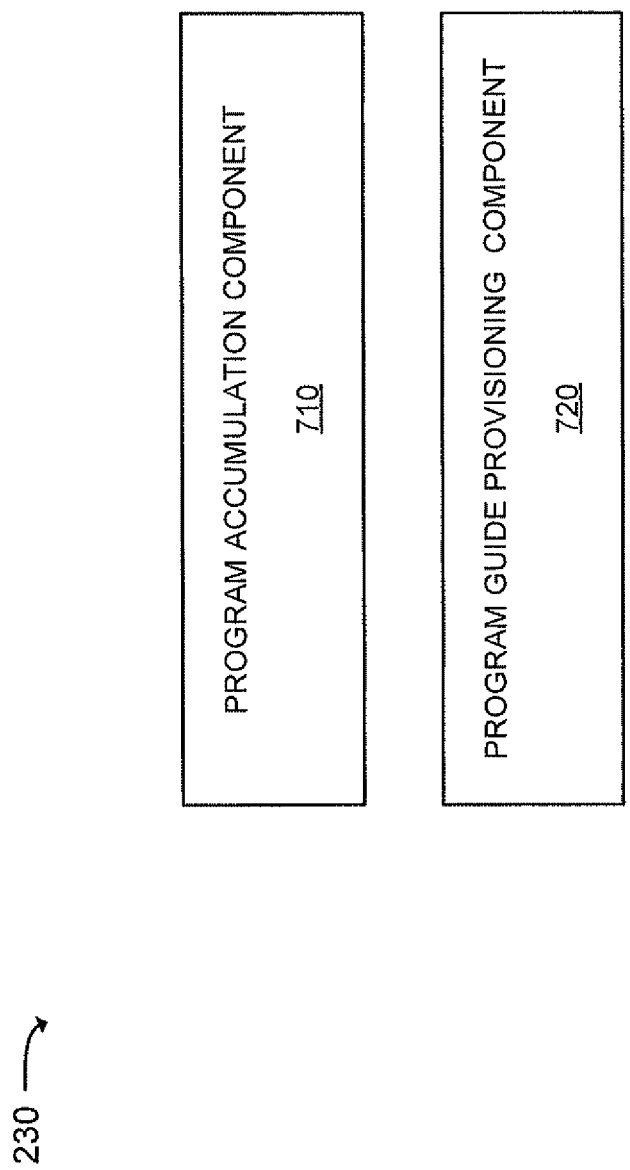
FIG. 7 is a diagram of exemplary functional components of the server of FIG. 2.

FIG. 7 is a diagram of exemplary functional components of server 230. As illustrated, server 230 may include a program accumulation component 710 and a program guide provisioning component 720.

Program accumulation component 710 may include one or more components that receive program information from set-top boxes and organize the program information in a database. Program accumulation component 710 may receive program information from a set-top box automatically (e.g., in response to an event being detected at the set-top box). Alternatively, or additionally, program accumulation component 710 may receive program information from a set-top box in response to a request, from server 230, for the program information. Program accumulation component 710 may update the program information in the database in real time.

Program guide provisioning component 720 may include one or more components that provide program guide information to set-top box 210. For example, program guide provisioning component 720 may receive a request for program guide information from set-top box 210, retrieve program guide information in response to the request, and send the program guide information to set-top box 210.

Although FIG. 7 shows exemplary functional components of server 230, in other embodiments, server 230 may include fewer, different, differently arranged, or additional components than depicted in FIG. 7. Additionally, or alternatively, one or more functional components of server 230 may perform the tasks described as being performed by one or more other functional components of server 230.

FIG. 8 is an exemplary database 800 that may be associated with server 230. While only one database is described below, database 800 may include multiple databases stored locally at server 230, or stored at one or more different and possibly remote locations.

As illustrated, database 800 may maintain a group of entries in the following exemplary fields: a program identifier (ID) field 810, a quantity field 820, an image field 830, a metadata field 840, and an other field 850.

Program ID field 810 may store information that identifies a program. The information may include a unique sequence of characters. The program identifier may not only identify the program, but also a time period that the program is airing, the channel on which the program is airing, and/or other information about the program. Quantity field 820 may store information identifying a value representing a quantity of set-top boxes that are currently tuned to or currently providing the program identified in program ID field 810. In one embodiment, quantity field 820 may store different quantity values for different geographic regions. Image field 830 may store an image or a link to an image that corresponds to the program identified in program ID field 810. The image may include a channel logo, a program logo, an actor thumbnail, poster art, and/or other types of images that may be displayed when the program, identified in field 810, is identified in a program guide. Metadata field 840 may store text that corresponds to the program identified in program ID field 810. The text may include the name of the program, a time period at which the program is airing on television, and/or other types of information that may be displayed when the program, identified in field 810, is provided in a program guide. Other field 850 may store additional information for the program identified in program ID field 810. The additional information may include, for example, category information that identifies the program category with which the program identified in program ID field 810 is associated, category information that identifies the source category with which the program identified in program ID field 810 is associated, and/or other types of information that may or may not be displayed when the program, identified in field 810, is identified in a program guide.

Although FIG. 8 shows exemplary fields of database 800, in other embodiments, database 800 may include fewer, different, differently arranged, or additional fields than depicted in FIG. 8.

Figure 9:
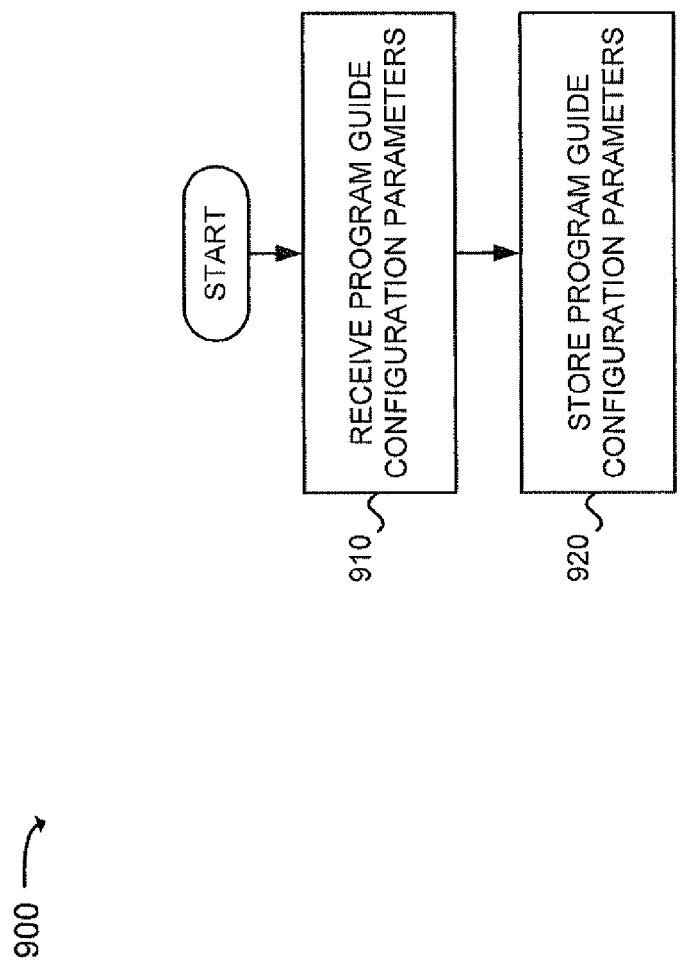
FIG. 9 is a flow chart of an exemplary process for configuring program guide parameters.

FIG. 9 is a flow chart of an exemplary process 900 for configuring program guide parameters. In one embodiment, the processing of FIG. 9 may be performed by set-top box 210. In another embodiment, some or all of the processing described below may be performed by one or more devices, including or excluding set-top box 210.

Process 900 may include receiving program guide configuration parameters (block 910). For example, a user may transmit a request to initiate the configuration of the program guide. For example, the user may press a button on a remote control or a button on set-top box 210. In response, set-top box 210 (e.g., program guide component 420) may cause a graphical user interface to be displayed on display 220. The graphical user interface may allow the user to enter program guide configuration parameters by, for example, entering the appropriate information using the remote control.

Process 900 may further include storing the program guide configuration parameters (block 920). For example, once the desired program guide configuration parameters have been entered, set-top box 210 (e.g., program guide component 420) may store the program guide configuration parameters. Program guide component 420 may store the program guide configuration parameters in a computer-readable medium, such as computer-readable medium 500.

In one embodiment, set-top box 210 (e.g., program guide component 420) may determine whether a new time period specified in the newly received set of program guide configuration parameters conflicts (e.g., matches or overlaps) with an already stored time period associated with a different set of program guide configuration parameters. If the new time period conflicts with an already stored time period, set-top box 210 (e.g., program guide component 420) may request that the user provide a priority to the two sets of program guide configuration parameters or modify the time period of one of the sets of program guide configuration parameters to eliminate the conflict.

Figure 10:
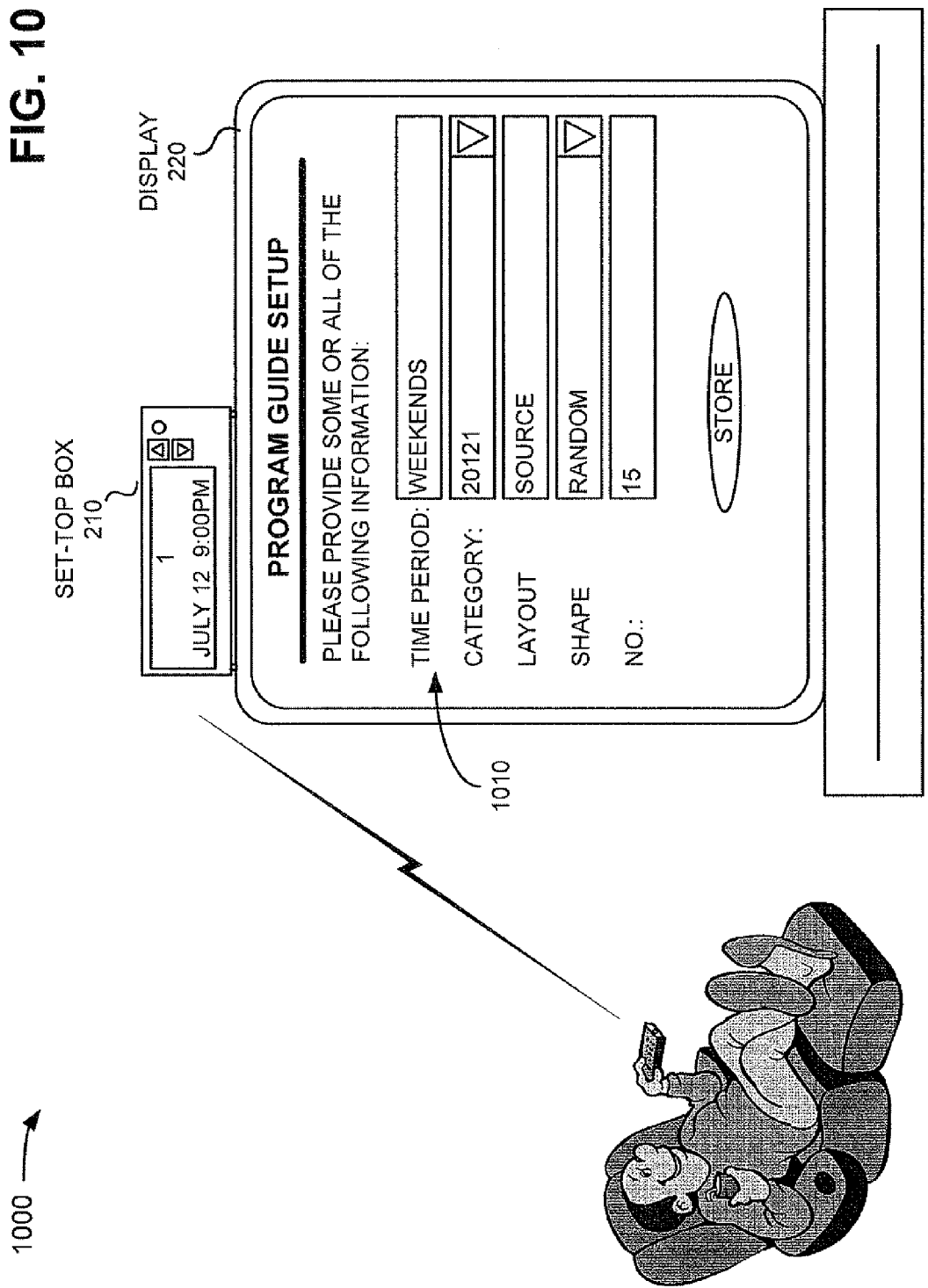
FIG. 10 is an example of the processing described above with respect to FIG. 9.

FIG. 10 is an example 1000 of the processing described above with respect to FIG. 9. In example 1000, assume that a user has requested to configure a set of program guide configuration parameters. In response to the request, set-top box 210 may provide a graphical user interface 1010 that allows the user to enter a set of program guide configuration parameters. As illustrated in FIG. 10, graphical user interface 1010 may allow the user to specify any or all of the following exemplary parameters: one or more time periods, one or more categories, a layout for the program guide, a shape with which the programs are to be represented, and a number of programs to be simultaneously provided. In example 1000, the user has specified that during weekends, 15 programs (e.g., the 15 most popular) that set-top boxes in the zip code of 20121 are tuned or providing should be displayed in a random shape. In addition, the user has specified that the 15 programs are to be separately displayed in the program guide based on the sources with which the programs are associated. By selecting the "STORE" button on graphical user interface 1010, set-top box 210 may store the received set of program guide configuration parameters in, for example, computer-readable medium 500.

Figure 11:
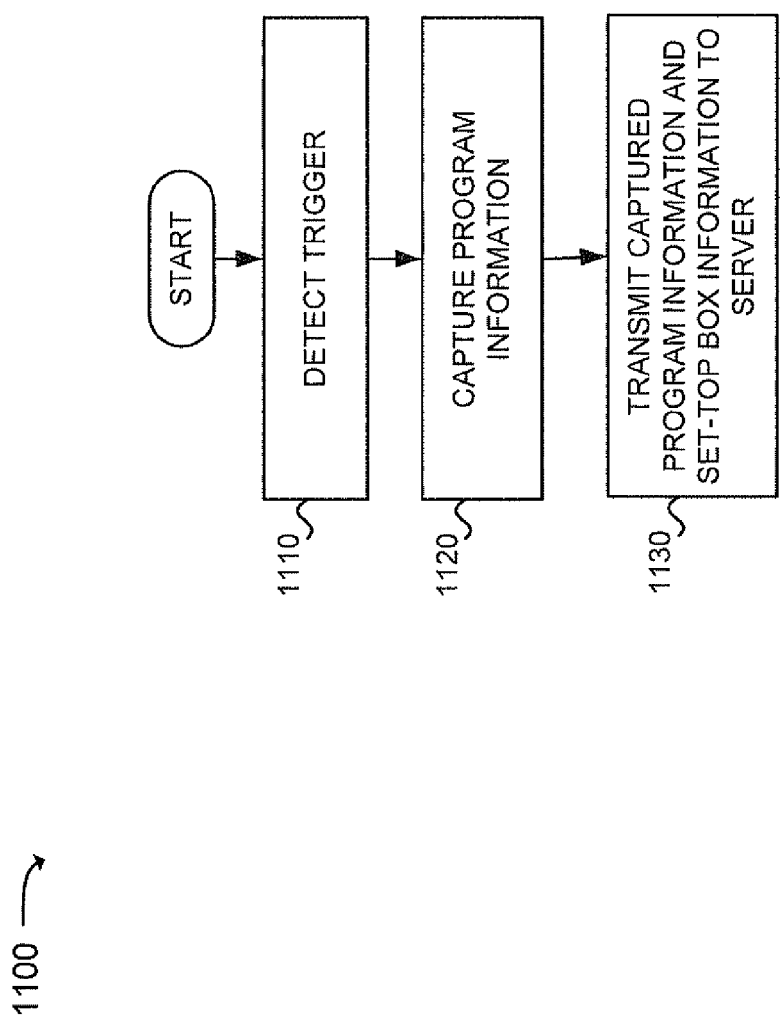
FIG. 11 is a flow chart of an exemplary process for transmitting program information to a server.

FIG. 11 is a flow chart of an exemplary process 1100 for transmitting program information to a server. In one embodiment, the processing of FIG. 11 may be performed by set-top box 210. In another embodiment, some or all of the processing described below may be performed by one or more devices, including or excluding set-top box 210.

Processing may begin with set-top box 210 detecting a trigger (block 1110). The trigger may be based on a number of factors, such as, for example, set-top box 210 being tuned to a channel, set-top box 210 being tuned to a channel for a particular period of time (e.g. to differentiate between a user watching a program and simply channel surfing), set-top box 210 beginning to play a selected program (e.g., a pay-per-view program, a video-on-demand program, a prerecorded program, etc.), and/or other factors. In one embodiment, set-top box 210 (e.g., program capture component 410) may start a timer each time the user changes a program being provided by set-top box 210. If the timer reaches a threshold value, a signal may be generated indicating that the threshold value has been met (i.e., the trigger has been detected). In another possible implementation, the trigger may be based on a period event. For example, every minute (or other time interval), set-top box 210 may perform the operations shown in FIG. 11.

Process 1100 may further include capturing program information (block 1120). For example, set-top box 210 (e.g., program capture component 410) may capture program information in response to detecting the trigger. The program information may include information that uniquely identifies the program. The program information may further include information identifying a time that the program information was captured, information identifying a television channel associated with the program, information identifying the source of the program (e.g., live television, pay-per-view, video-on-demand, digital video recorder, user generated content, etc.), and/or other information.

Process 1100 may also include transmitting the captured program information and set-top box information to a server (block 1130). The set-top box information may include information identifying set-top box 210 (e.g., a unique sequence of characters). Set-top box 210 (e.g., program capture component 410) may transmit the program information and the set-top box information to server 230. In this way, set-top box 210 may provide captured program information and set-top box information each time a trigger occurs, as described above with respect to block 1110.

Figure 12:
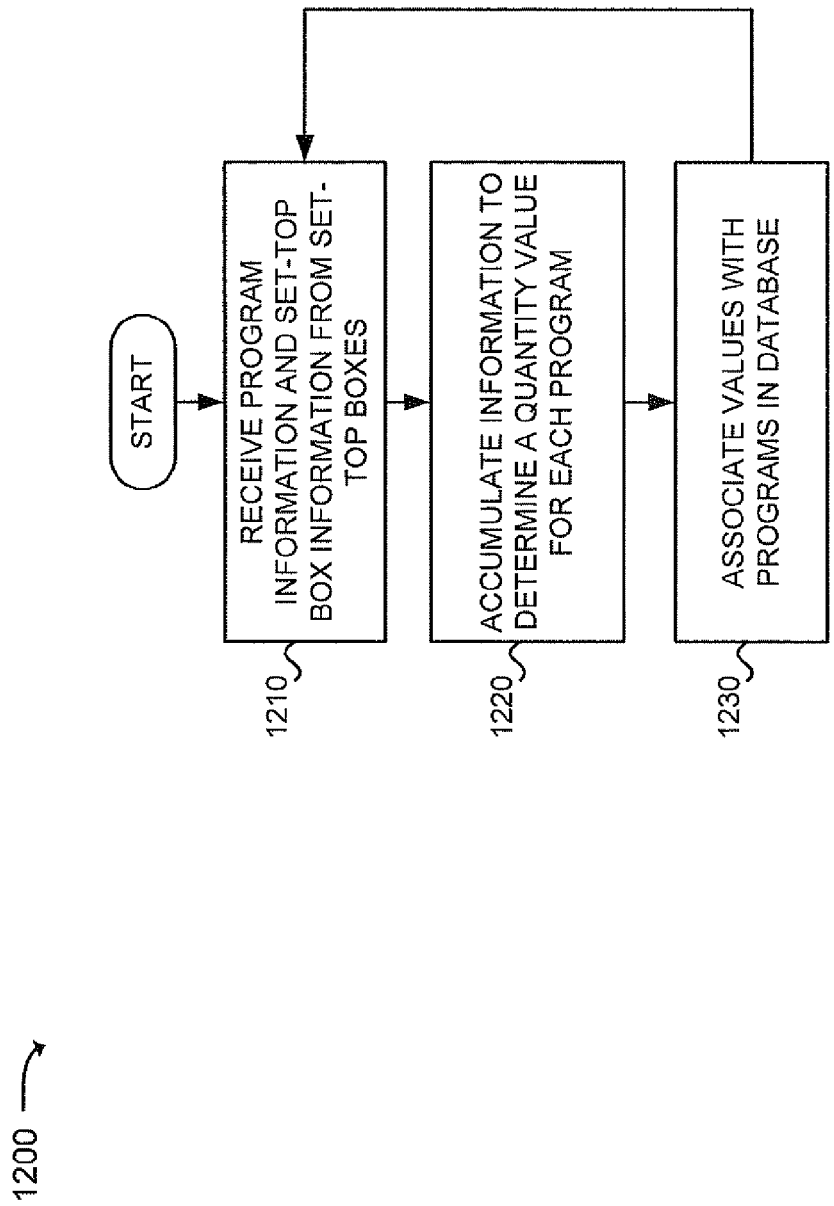
FIG. 12 is a flow chart of an exemplary process for accumulating program information from set-top boxes.

FIG. 12 is a flow chart of an exemplary process 1200 for accumulating program information from set-top boxes. In one embodiment, the processing of FIG. 12 may be performed by server 230. In another embodiment, some or all of the processing described below may be performed by one or more devices, including or excluding server 230.

Process 1200 may include receiving program information and set-top box information from set-top boxes (block 1210). For example, server 230 (e.g., program accumulation component 710) may receive the program information and the set-top box information that is transmitted by set-top boxes, including set-top box 210.

Process 1200 may include accumulating the program information and the set-top box information to determine a quantity value for each program (block 1220). As indicated above, the quantity value may represent a quantity of set-top boxes currently tuned to the program or currently providing the program to displays. For example, server 230 (e.g., program accumulation component 710) may parse the information received from set-top boxes to identify the programs and the set-top boxes that provided the program information. Server 230 (e.g., program accumulation component 710) may track, for each program, a quantity (or volume) of set-top boxes that have identified the same program. By keeping a running tally of the quantity of set-top boxes that have identified the same program (as being a program that the set-top box is currently providing to the display), server 230 (e.g., program accumulation component 710) may determine a value representing the quantity of set-top boxes that are currently tuned to or currently providing the program.

In one embodiment, server 230 (e.g., program accumulation component 710) may track the transmission of program information and set-top box information from a set-top box to determine whether the set-top box is actually being used to watch the program or simply to channel surf. For example, if server 230 (e.g., program accumulation component 710) receives more than one set of program information from the same set-top box during a period of time (e.g., within 2 minutes), server 230 (e.g., program accumulation component 710) may determine that the set-top box is being used for channel surfing and may disregard the program information when determining the current quantity of set-top boxes currently tuned to or providing the program. Thus, in one exemplary embodiment, server 230 (e.g., program accumulation component 710) may only increase the quantity value for the program when a set-top box has been tuned to a program for more than some period of time. Alternatively, as indicated above with respect to FIG. 11, set-top box 210 may be configured to only transmit the program information and the set-top box information to server 230 when set-top box 210 is tuned to a program or is providing the program for more than some period of time. Additionally, server 230 (e.g., program accumulation component 710) may, as a set-top box is tuned to a different program or begins providing a different program (as evidenced by new program information being received from the set-top box), decrease the quantity value associated with the former program and increase the quantity value associated with the latter program. In this way, server 230 (e.g., program accumulation component 710) may keep an accurate accounting, in real time, of the quantity of set-top boxes tuned to or providing a program.

In addition, server 230 (e.g., program accumulation component 710) may use the set-top box information to determine a location of the set-top boxes that are providing the program information. For example, server 230 may be associated with a database that associates set-top box identifiers with location information (e.g., an address, a zip code, a town, a city, a state, etc.). Using this information, server 230 (e.g., program accumulation component 710) may determine, for a group of programs, the quantity of set-top boxes currently tuned to or currently providing the programs in a particular geographic area.

Process 1200 may also include associating values with programs in a database (block 1230). For example, server 230 (e.g., program accumulation component 710) may store, for a program and in a database, such as database 800, a value representing a quantity of set-top boxes currently tuned to or currently providing the program. In addition, server 230 (e.g., program accumulation component 710) may store other accumulated information in database 800, such as values representing a quantity of set-top boxes currently tuned to or currently providing the program for different geographic regions.

Although not described above, server 230 may also track the frequency with which set-top boxes are being tuned to a particular program. For example, if a football game goes into overtime, the number of set-top boxes that may be tuned to the football game may increase, as the game approaches overtime. Thus, the frequency of set-top boxes being tuned to the football game may increase. This frequency information may also be associated with a program in database 800 (e.g., in other field 850).

Figure 13A:
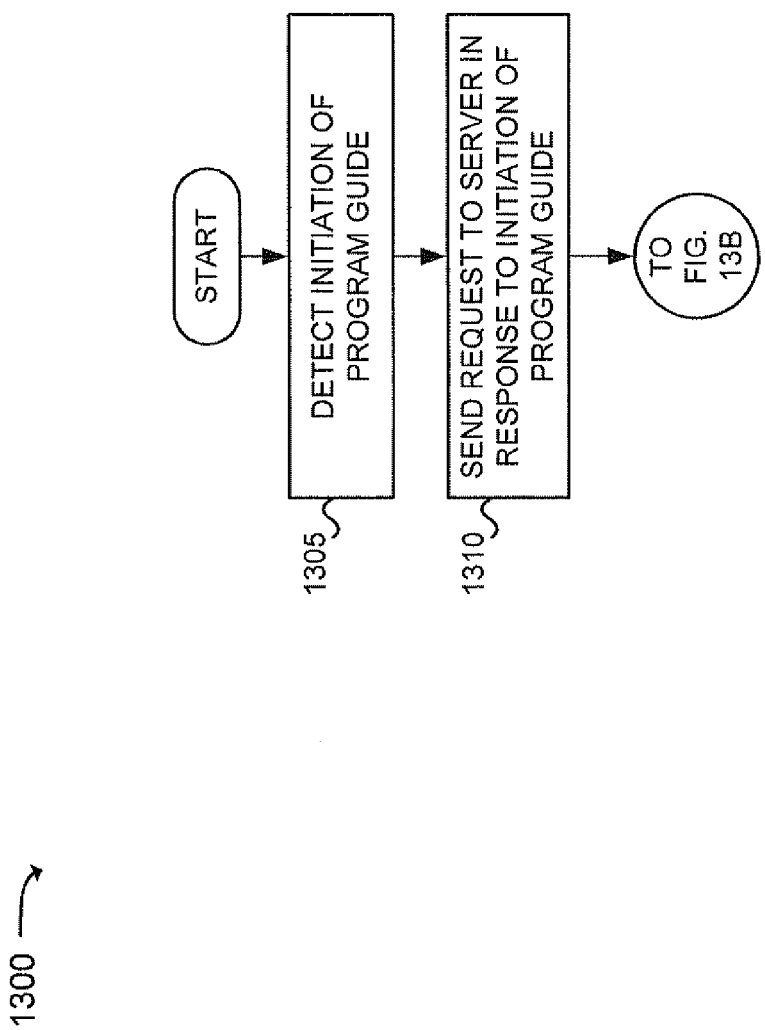
Figure 13B:
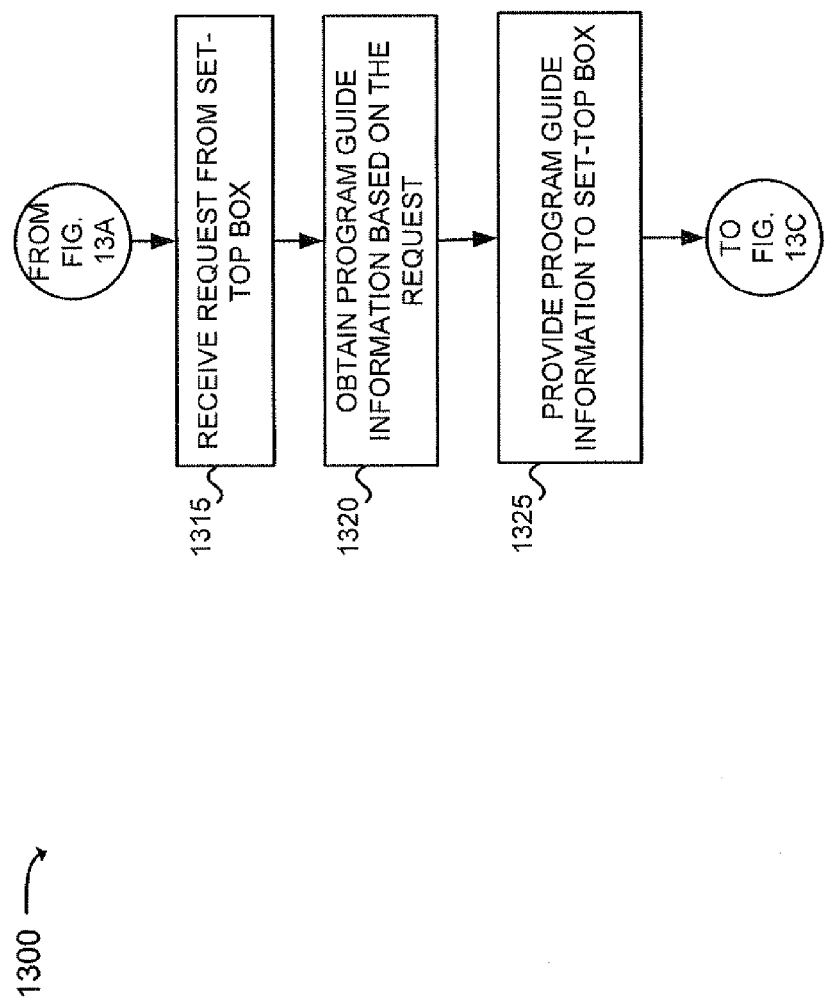
Figure 14A:
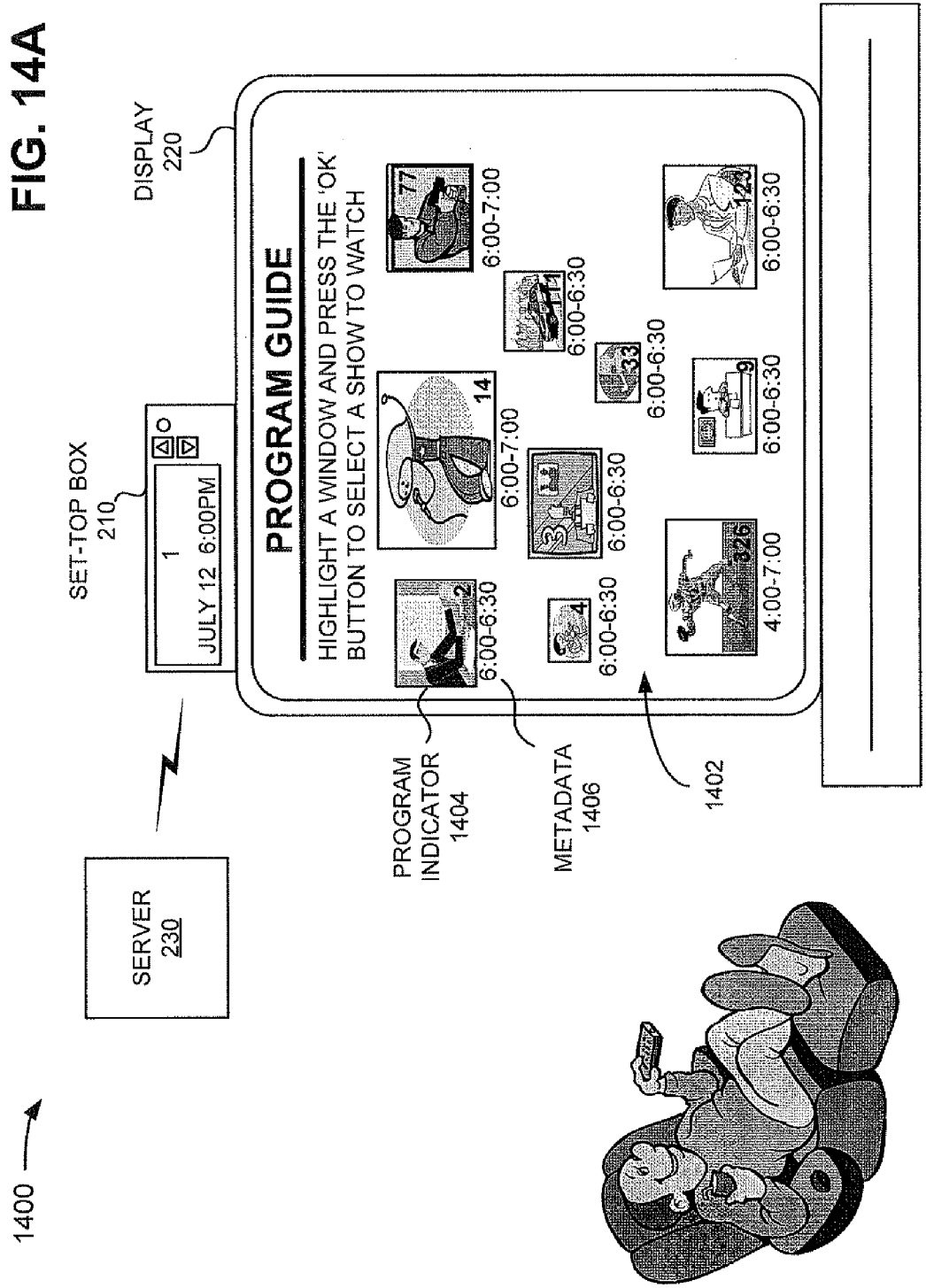
Figure 14B:
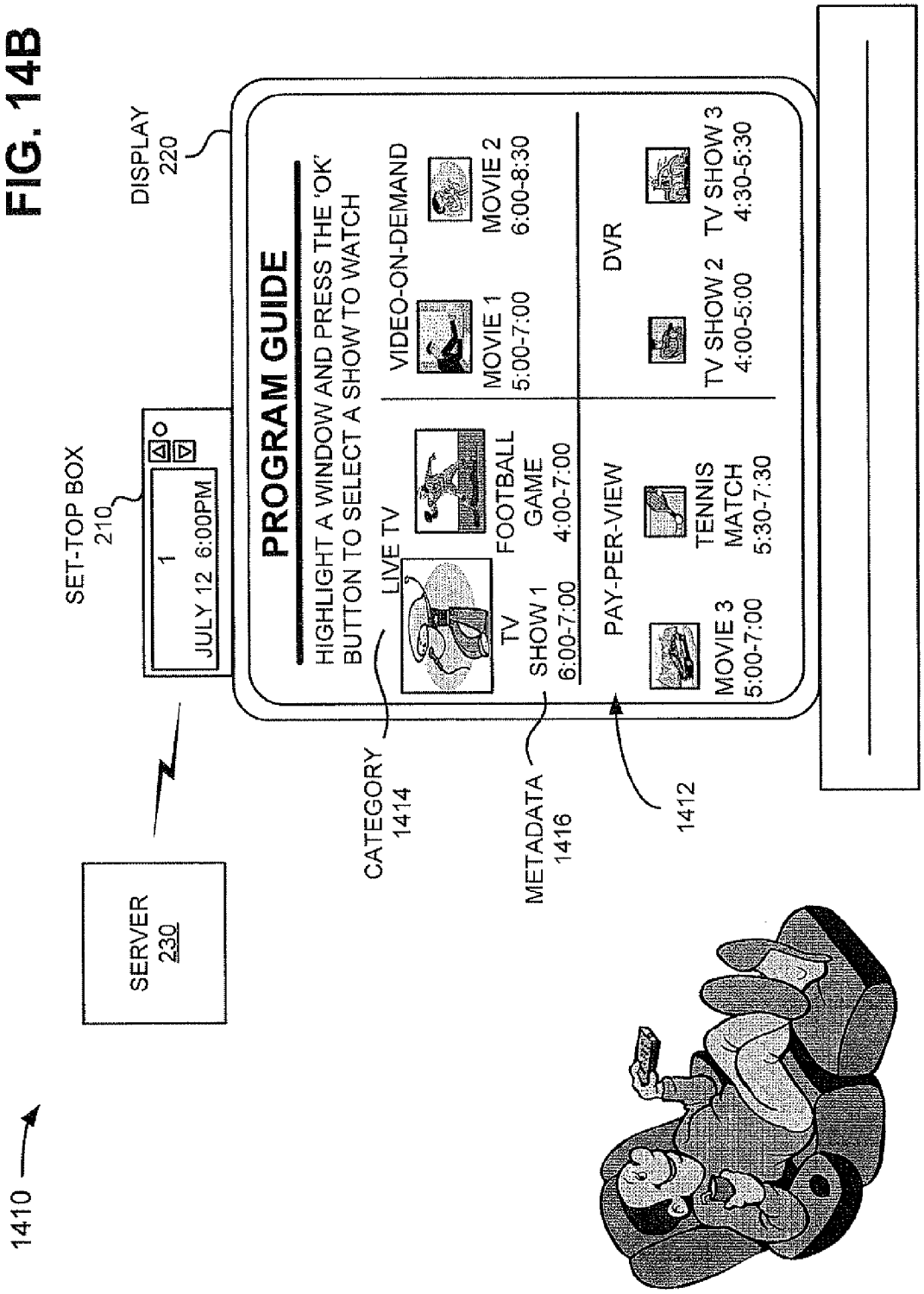
Figure 14D:
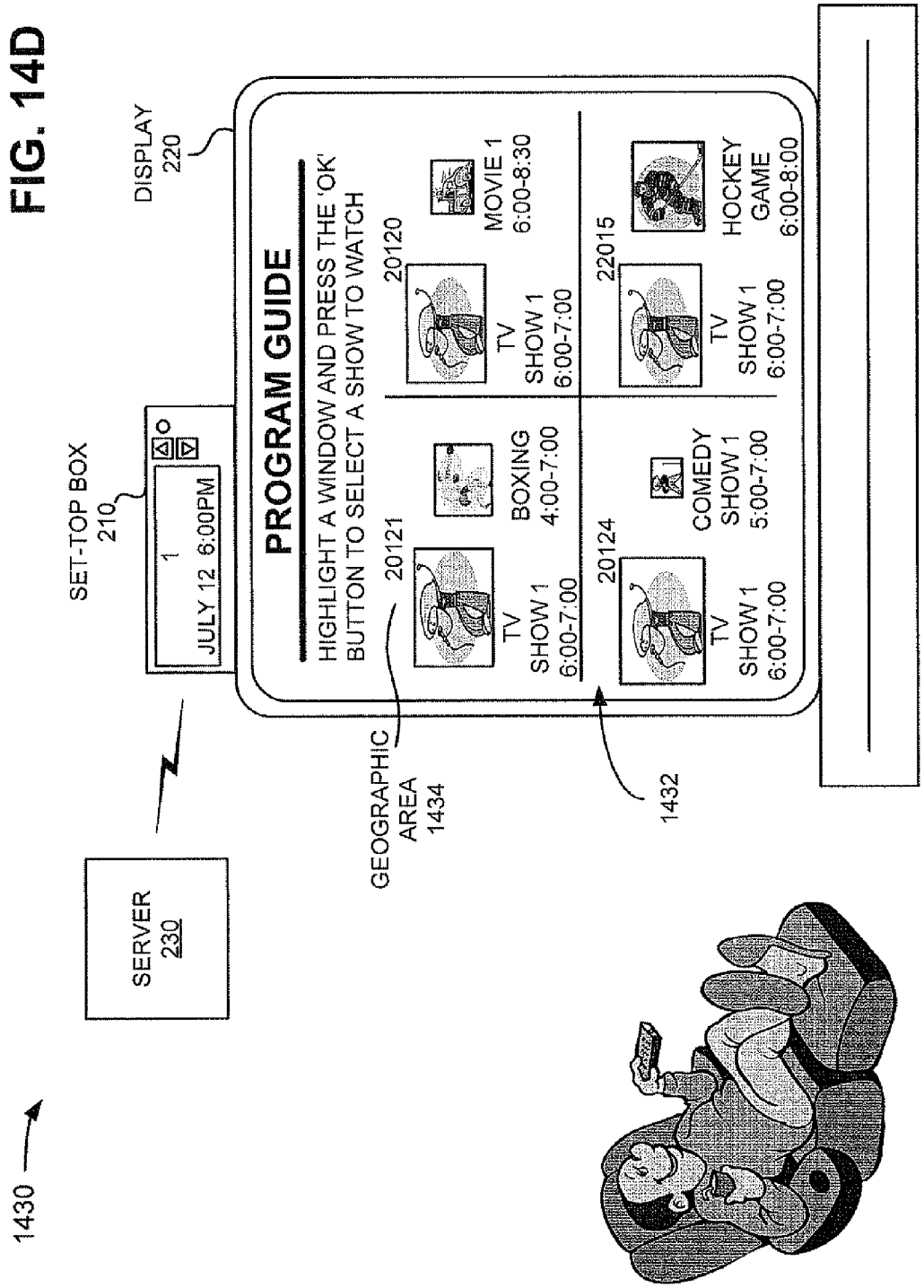

FIGS. 13A-13C is a flow chart of an exemplary process 1300 for providing a dynamic program guide. In one embodiment, the processing of FIGS. 13A and 13C may be performed by set-top box 210 and the processing of FIG. 13B may be performed by server 230. In another embodiment, some or all of the processing described below may be performed by one or more devices, including or excluding set-top box 210 and server 230.

Process 1300 may include detecting an initiation of the program guide (block 1310, FIG. 13A). For example, set-top box 210 (e.g., program guide component 420) may initiate the program guide in response to set-top box 210 being tuned to a particular channel (e.g., a program guide channel). For example, a channel may be dedicated to providing a program guide. Thus, if the user tunes set-top box 210 to that channel, set-top box 210 (e.g., program guide component 420) may detect the tuning and initiate the program guide.

Additionally, or alternatively, set-top box 210 (e.g., program guide component 420) may initiate the program guide in response to an item selected from a menu provided by set-top box 210. For example, set-top box 210 may provide a menu that allows the user to configure a number of settings associated with providing television programming. The menu may include a menu item that allows the user to initiate the program guide. Thus, set-top box 210 (e.g., program guide component 420) may detect selection of the program guide menu item.

Additionally, or alternatively, set-top box 210 (e.g., program guide component 420) may initiate the program guide in response to a shortcut button selected from a remote control. For example, a remote control may include a program guide shortcut button that, when selected, sends a particular signal to set-top box 210. The signal (e.g., an infrared or radio frequency signal) may allow the user to initiate the program guide.

Process 1300 may further include sending a request to a server in response to detecting the initiation of the program guide (block 1310). For example, set-top box 210 (e.g., program guide component 420) may transmit a request for program guide information to server 230. The request may or may not include one or more of the program guide configuration parameters set by the user in connection with process 900 of FIG. 9. When the request includes one or more of the program guide configuration parameters, set-top box 210 (e.g., program guide component 420) may, for example, retrieve the appropriate entry from computer-readable medium 500 and transmit one or more of the configuration parameters in the entry to server 230. Set-top box 210 (e.g., program guide component 420) may select the appropriate entry based, for example, on a current day/time. The configuration parameters that are transmitted to server 230 may include, for example, information identifying the program category or categories that are to be included in the program guide, information identifying the source category or categories that are to be included in the program guide, and/or other parameters. Set-top box 210 (e.g., program guide component 420) may transmit the request to server 230 via network 240.

Process 1300 may also include receiving the request for program guide information from a set-top box (block 1315, FIG. 13B). For example, server 230 (e.g., program guide provisioning component 720) may receive the request transmitted by set-top box 210.

Process 1300 may include obtaining program guide information based on the request (block 1320). In those situations where the received request does not include one or more of the program guide configuration parameters, server 230 (e.g., program guide provisioning component 720) may, for example, access database 800 and identify a predetermined number of programs having the highest quantity values in field 820. The predetermined number may be configurable. To identify the predetermined number of programs, server 230 (e.g., program guide provisioning component 720) may compare the quantity values from the entries in database 800. Server 230 (e.g., program guide provisioning component 720) may retrieve information identifying the programs and the quantity values from field 820 for the identified programs, along with, for example, the image (also called a "program indicator" hereinafter) identified in image field 830, the metadata identified in metadata field 840, and/or the information identified in other field 850 (such as the frequency with which set-top boxes are tuning to a program). Thus, the obtained program guide information may include information from one or more of fields 810-850 or information relating to information from one or more of fields 810-850.

In those situations where the received request includes one or more of the program guide configuration parameters, server 230 (e.g., program guide provisioning component 720) may use the program guide configuration parameter(s) to identify the appropriate program guide information to retrieve from database 800. For example, if the received request indicates that the program guide information is to include program information for a particular geographic region, server 230 (e.g., program guide provisioning component 720) may retrieve only that program guide information from database 800 that pertains to the geographic region. The obtained program guide information, for this situation, may also include information from one or more of fields 810-850.

Process 1300 may further include providing program guide information to a set-top box (block 1325). For example, server 230 (e.g., program guide provisioning component 720) may transmit the program guide information to set-top box 210 via network 240.

Process 1300 may additionally include receiving the program guide information from a server (block 1330, FIG. 13C). For example, set-top box 210 (e.g., program guide component 420) may receive the program guide information transmitted by server 230.

In those situations where set-top box 210 did not previously identify a set of program guide configuration parameters, process 1300 may include capturing a current date/time and identifying program guide configuration parameters based on the current date/time (blocks 1335 and 1340). For example, set-top box 210 may store a calendar application and a clock. Set-top box 210 (e.g., program guide component 420) may capture a current date and a current time in response, for example, to receiving program guide information from server 230. Set-top box 210 may, for example, use the captured date/time to look up a set of program guide configuration parameters from, for example, computer-readable medium 500. As an example, if the captured date/time indicates that it is currently a weekend day, set-top box 210 may identify the first entry illustrated in computer-readable medium 500 of FIG. 5 (i.e., the entry for weekends) as the appropriate set of program guide configuration parameters.

Process 1300 may include providing information from the received program guide information based on the program guide configuration parameters (block 1345). For example, set-top box 210 (e.g., program guide component 420) may provide, to display 220 and according to the program guide configuration parameters, information from the received program guide information in a program guide. As set forth above, the program guide configuration parameters may be identified in response to detection of the initiation of the program guide or in response to receiving program guide information from server 230. Set-top box 210 (e.g., program guide component 420) may provide a program guide for display on display 220 based on the program guide configuration parameters. As one example, for the weekends entry in computer-readable medium 500, set-top box 210 (e.g., program guide component 420) may cause the program guide to be separated by source category and display, for each source category, the 15 highest ranking programs using random shapes. The size of the shapes, with which the programs are associated, may reflect the quantity of set-top boxes that are currently tuned to the programs or are currently providing the programs. For example, assume there are 10,000 set-top boxes currently tuned to program A and 100,000 set-top boxes currently tuned to program B. Set-top box 210 (e.g., program guide component 420) may cause the size of the shape representing program A, in the program guide, to be smaller than the size of the shape representing program B. In addition, the program guide may include other types of information, such as the program images and metadata provided by server 230. In any event, set-top box 210 (e.g., program guide component 420) may cause a program guide to be displayed that, among other things, depicts programs, along with an indication of the quantity of set-top boxes that are currently tuned to the programs or are currently providing the programs.

While the program guide is being provided to display 220, set-top box 210 may continually receive updated program guide information from server 230 and cause the information displayed in the program guide to be dynamically updated. In one embodiment, set-top box 210 may receive updated program guide information every few milliseconds. For example, assume that at some later point in time, the information accumulated by server 230 indicates that the quantity of set-top boxes currently tuned to program A increases to 40,000 set-top boxes and that the quantity of set-top boxes currently tuned to program B decreases to 40,000 set-top boxes. Server 230 may transmit this updated information to set-top box 210, which may dynamically cause the size of the shape representing program A, in the program guide, to be substantially the same as the size of the shape representing program B. In this way, the program guide may be dynamically updated (e.g., by dynamically increasing or decreasing shapes representing the programs) to reflect the quantity (or portion) of set-top boxes that are currently tuned to the programs or are currently providing the programs.

Process 1300 may determine whether a displayed program has been selected (block 1350). For example, if the user sees a program that is of interest (e.g., the user notices that a particular program has the largest shape and wants to see what everyone is watching), the user may, via a remote control, highlight the desired shape (corresponding to the program) on display 220, and press a particular button on the remote control, such as an "enter" or "OK" button, to select the program. Other ways for selecting a program may alternatively be used.

If set-top box 210 (e.g., program guide component 420) determines that no program has been selected (block 1350—NO), processing may return to block 1330 with set-top box 210 (e.g., program guide component 420) continuing to receive updated program guide information from server 230. If, on the other hand, set-top box 210 (e.g., program guide component 420) determines that a program has been selected (block 1350—YES), set-top box 210 (e.g., program guide component 420) may tune to the channel corresponding to the selected program (block 1355), which causes set-top box 210 to provide the program to display 220. Alternatively, set-top box 210 may provide the user with the opportunity to download or purchase the selected program.

Other ways of terminating the program guide are also possible. For example, the program guide may be terminated by turning off set-top box 210, tuning set-top box 210 to a channel (e.g., by selecting the channel up/down buttons on the remote control or set-top box 210 or entering a particular channel number into remote control 230), by selecting a particular button on the remote control, etc.

FIGS. 14A-14E are examples of ways in which a dynamic program guide may be provided. In example 1400 (FIG. 14A), assume that the user has activated a program guide 1402 by tuning set-top box 210 to a particular channel (shown as channel "1" in example 1400). In this example, program guide 1402 may cause the 10 highest ranking programs to be displayed (e.g., ranked based on the quantity of set-top boxes currently tuned to the programs or currently providing the programs). Each program is represented by a program indicator 1404 (e.g., a recognizable image associated with the program) and metadata 1406 (which, in example 1400, corresponds to a time that the program is airing). In addition, each program is represented by a shape, the size of which reflects the quantity of set-top boxes tuned to that particular program or currently providing that particular program. In example 1400, the program on channel 14 (which airs from 6:00 PM to 7:00 PM) is currently tuned to or provided by the highest quantity of set-top boxes and, thus, has the largest size. Set-top box 210 may continually receive updates to the program information in program guide 1402, causing the shapes of the programs to dynamically increase, as additional set-top boxes tune to or provide the program, or decrease, as set-top boxes tune away from or stop providing the program. In this way, a user may be able to instantly identify the program(s) that are currently the most popular and, if desired, to track the popularity of the programs over time. Although the example above was described with respect to the number of set-top boxes tuned to a channel, in some implementations, the sizes of the shapes may changed based on the relative number (or portion) of tuned set-top boxes. For example, even though the number of set-top boxes tuned to a program may increase, the shape corresponding to the program may be decreased in size if the number of set-top boxes tuned to other programs increases by a greater amount.

In example 1410 (FIG. 14B), assume that the user has activated a program guide 1412 by tuning set-top box 210 to a particular channel (shown as channel "1" in example 1410). In this example, program guide 1412 may be divided into source categories 1414, such as a live television (TV) category, a video-on-demand category, a pay-per-view category, and a digital video recorder (DVR) category. Each category 1414 may include a number of highest ranking programs in that particular category (e.g., ranked based on the quantity of set-top boxes currently tuned to the programs or currently providing the programs). Each program may be represented by a program indicator 1416 (e.g., a recognizable image associated with the program) and metadata 1418 (which, in example 1410, corresponds to a name of the program and a time that the program is airing). In addition, each program is represented by a shape, the size of which reflects the quantity of set-top boxes currently tuned to that particular program or currently providing that particular program. In example 1410, the program, entitled "TV SHOW 1" is currently tuned to or provided by the highest quantity of set-top boxes and, thus, has the largest size. Set-top box 210 may continually receive updates to the program information in program guide 1412, causing the shapes of the programs to dynamically increase, as additional set-top boxes tune to or provide the program, or decrease, as set-top boxes tune away from or stop providing the program. In this way, a user may be able to instantly identify the programs that are currently the most popular for a group of different sources and, if desired, to track the popularity of programs for those sources over time.

In example 1420 (FIG. 14C), assume that the user has activated a program guide 1422 by tuning set-top box 210 to a particular channel (shown as channel "1" in example 1420). In this example, program guide 1422 may be divided into program categories 1424, such as a sports category, a kids category, a drama category, and a comedy category. Each category 1424 may include a number of highest ranking programs in that particular category (e.g., ranked based on the quantity of set-top boxes currently tuned to the programs or currently providing the programs). Each program may be represented by a program indicator (e.g., a recognizable image associated with the program) and metadata (which, in example 1420, corresponds to a name of the program and a time that the program is airing). In addition, each program is represented by a shape, the size of which reflects the quantity of set-top boxes currently tuned to that particular program or currently providing that particular program. In example 1420, the program, entitled "HOCKEY GAME" is currently tuned to or provided by the highest quantity of set-top boxes and, thus, has the largest size and the program, entitled "TV SHOW 4" is currently tuned to or provided by the second highest quantity of set-top boxes and, thus, has the second largest size. Set-top box 210 may continually receive updates to the program information in program guide 1422, causing the shapes of the programs to dynamically increase, as additional set-top boxes tune to or provide the program, or decrease, as set-top boxes tune away from or stop providing the program. In this way, a user may be able to instantly identify the programs that are currently the most popular for a group of different program categories and, if desired, track the popularity of programs in those program categories over time.

In example 1430 (FIG. 14D), assume that the user has activated a program guide 1432 by tuning set-top box 210 to a particular channel (shown as channel "1" in example 1430). In this example, program guide 1432 may be divided into geographical areas 1434, such as zip codes 20121, 20120, 20124, and 22015. Each category 1434 may include a number of highest ranking programs in that particular geographic area (e.g., ranked based on the quantity of set-top boxes in that geographic area that are currently tuned to the programs or currently providing the programs). Each program may be represented by a program indicator (e.g., a recognizable image associated with the program) and metadata (which, in example 1430, corresponds to a name of the program and a time that the program is airing). In addition, each program is represented by a shape, the size of which reflects the quantity of set-top boxes tuned to that particular program or currently providing that particular program. In example 1430, the program, entitled "TV SHOW 1" is currently tuned to or provided by the highest quantity of set-top boxes in each geographic area and, thus, has the largest size in each geographic area. Set-top box 210 may continually receive updates to the program information in program guide 1432, causing the shapes of the programs to dynamically increase, as additional set-top boxes tune to or provide the program, or decrease, as set-top boxes tune away from or stop providing the program. In this way, a user may be able to instantly identify the programs that are currently the most popular for different geographic areas and, if desired, track the popularity of programs in those geographic areas over time.

In example 1440 (FIG. 14E), assume that, while watching a program 1442, entitled "THE COOKING SHOW," the user activates a program guide 1444 by selecting a particular button on the user's remote control. In this example, the activation causes program guide 1444 to be presented as a sidebar on display 220 (i.e., program 1442 and program guide 1444 are simultaneously provided on display 220). Program guide 1444 may, in example 1440, present a predetermined number of highest ranking programs (e.g., ranked based on the quantity of set-top boxes in that are currently tuned to the programs or currently providing the programs) as an ever changing list or possibly as a scroll bar. Program guide 1444 may be presented in accordance with any of the earlier examples 1400, 1410, 1420, or 1430. Each program, in program guide 1444, may be represented by a program indicator (e.g., a recognizable image associated with the program) and metadata (which, in example 1440, corresponds to a time that the program is airing). In addition, each program is represented by a shape, the size of which reflects the quantity of set-top boxes tuned to that particular program or currently providing that particular program. Set-top box 210 may continually receive updates, from server 230, to the program information in program guide 1432, causing the shapes of the programs to dynamically increase, as additional set-top boxes tune to or provide the program, or decrease, as set-top boxes tune away from or stop providing the program. In this way, a user may be able to instantly identify the programs that are currently the most popular while simultaneously watching a desired program and, if desired, track the popularity of programs over time.

The foregoing description provides illustration and description, but is not intended to be exhaustive or to limit the invention to the precise form disclosed. Modifications and variations are possible in light of the above teachings or may be acquired from practice of the invention. For example, while the above description focused on a user configuring parameters associated with a program guide, it will be appreciated that the user may reconfigure those parameters at any time to cause different information to be displayed in the program guide.

While series of blocks have been described with regard to FIGS. 9 and 11-13C, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
one or more processors to:
receive, from a server, first program guide information,
the first program guide information relating to a group of programs,
the group of programs including a first program and a second program, and
the first program guide information indicating that, at a first point in time, more set-top boxes are tuned to the first program than are tuned to the second program,
provide, for display and based on the first program guide information, a program guide,
the program guide representing the first program as a first shape and the second program as a second shape, and
a first size of the first shape being larger than a second size of the second shape based on more of the set-top boxes being tuned to the first program than are tuned to the second program at the first point in time,
receive, from the server and after providing the program guide, second program guide information,
the second program guide information indicating that, at a second point in time that is later than the first point in time, more of the set-top boxes are tuned to the second program for display than are tuned to the first program, and
dynamically increase the second size of the second shape based on more of the set-top boxes being tuned to the second program program for display than are tuned to the first program at the second point in time.

2. The system of claim 1,
where the one or more processors are part of a set-top box of the set-top boxes,
where the one or more processors are further to:
detect a trigger, and
transmit, based on the trigger, a request for the first program guide information, and
where the trigger includes at least one of:
a first signal representing that the set-top box has been tuned to a particular television channel,
a second signal representing that a program guide menu item has been selected, or
a third signal representing that the set-top box has received a fourth signal from a remote control indicating a desire to initiate the program guide.

3. The system of claim 1,
where the one or more processors are further to:
receive, from a user, first information identifying a type of shape that is to be used to represent the first program and the second program in the program guide,
the first shape and the second shape being of the type of shape, and
receive, from the user, second information identifying a quantity of programs to be provided in the program guide, and
where, when providing the program guide, the one or more processors are to:

provide the program guide based on the first program guide information, the first information, and the second information.

4. The system of claim 1,
where the first program guide information includes:
first text indicating a first time period when the first program airs, and
second text indicating a second time period when the second program airs, and
where, when providing the program guide, the one or more processors are further to:
cause the first text to be displayed, in the program guide, in association with the first shape, and
cause the second text to be displayed, in the program guide, in association with the second shape.

5. The system of claim 1,
where the first program guide information includes:
information indicating a program category associated with the first program, and
where, when providing the program guide, the one or more processors are further to:
cause the first shape to be grouped, in the program guide, with one or more other shapes that represent one or more other programs, of the group of programs, that are associated with the program category.

6. The system of claim 1,
where the first program guide information includes:
information indicating a source category associated with the first program, and
where, when providing the program guide, the one or more processors are further to:
cause the first shape to be grouped, in the program guide, with one or more other shapes that represent one or more other programs, of the group of programs, that are associated with the source category.

7. The system of claim 1,
where the first program guide information includes information identifying one or more geographic regions, and
where, when providing the program guide, the one or more processors are further to:
cause the first shape to be grouped, in the program guide, based on the information identifying the one or more geographic regions.

8. The system of claim 1,
where the one or more processors are further to:
receive a set of program guide configuration parameters from a user, and
where, when providing the program guide, the one or more processors are to:
provide the program guide in accordance with the set of program guide configuration parameters.

9. The system of claim 1, where the one or more processors are further to:
detect selection of the first shape in the program guide, and
one of:
tune, based on the selection of the first shape, to the first program,
present, based on the selection of the first shape, an opportunity to download the first program, or
present, based on the selection of the first shape, an opportunity to purchase the first program.

10. A method comprising:
receiving, by a server, program information from a plurality of set-top boxes,
the program information including information identifying programs to which the plurality of set-top boxes are tuned;

determining, by the server and based on the program information, a quantity value for a particular program of the programs,
    the quantity value representing a first quantity of set-top boxes, of the plurality of set-top boxes, tuned to the particular program at a first point in time;
providing, by the server and to a particular set-top box, information identifying the particular program and first information relating to the quantity value,
    the information identifying the particular program and the first information relating to the quantity value being used by the particular set-top box in providing a program guide that represents the particular program as a first shape and a different program, of the programs, as a second shape, and
    a first size of the first shape being larger than a second size of the second shape based on more of the plurality of set-top boxes being tuned to the particular program than are tuned to the different program at the first point in time;
updating, by the server, the quantity value to obtain an updated quantity value for the particular program; and
providing, by the server and to the particular set-top box, second information relating to the updated quantity value after the particular set-top box provides the program guide,
    the updated quantity value representing a second quantity of set-top boxes, of the plurality of set-top boxes, tuned to the particular program at a second point in time that is later than the first point in time.

11. The method of claim 10, further comprising:
determining, a second quantity value, that represents a first different quantity of set-top boxes, of the plurality of set-top boxes, that are, at the first point in time, tuned to the different program; and
updating the second quantity value based on a second different quantity of set-top boxes, of the plurality of set-top boxes, tuned to the different program at the second point in time.

12. The method of claim 10,
where providing the information identifying the particular program and the first information relating to the quantity value includes:
    providing an image associated with the particular program.

13. The method of claim 10,
where providing the information identifying the particular program and the first information relating to the quantity value includes:
    providing text indicating a time period when the particular program airs.

14. A system comprising:
a server to:
    receive, from a plurality of set-top boxes, program information,
        the program information indicating a plurality of programs to which the plurality of set-top boxes are tuned,
    determine, for the plurality of programs, quantity indicators,
        a particular quantity indicator, of the quantity indicators, representing, for a particular program, of the plurality of programs, a first quantity of set-top boxes, of the plurality of set-top boxes, that are tuned to the particular program at a first point in time, and
    provide, to a particular set-top box of the plurality of set-top boxes, first program guide information based on the quantity indicators,
        the first program guide information being used by the particular set-top box to provide a program guide that represents the particular program as a first shape and a different program, of the plurality of programs, as a second shape, and
        a first size of the first shape being larger than a second size of the second shape based on more of the plurality of set-top boxes being tuned to the particular program than are tuned to the different program at the first point in time,
    update the quantity indicators to obtain updated quantity indicators,
        a particular updated quantity indicator, of the updated quantity indicators, representing, for the particular program, a second quantity of set-top boxes, of the plurality of set-top boxes, that are tuned to the particular program at a second point in time that is later than the first point in time, and
    provide, to the particular set-top box and after the particular set-top box provides the program guide, second program guide information based on the updated quantity indicators.

15. A method comprising:
receiving, by a set-top box, first program guide information from a server,
    the first program guide information identifying a group of programs,
    the group of programs including a first program and a second program, and
    the first program guide information indicating that, at a first point in time, more set-top boxes are tuned to the first program than are tuned to the second program;
providing, from the set-top box to a display and based on the first program guide information, a program guide,
    the program guide representing the first program as a first shape and the second program as a second shape,
    a first size of the first shape being larger than a second size of the second shape based on more of the set-top boxes being tuned to the first program than are tuned to the second program at the first point in time;
receiving, after providing the program guide, second program guide information from the server,
    the second program guide information indicating that, at a second point in time that is later than the first point in time, more of the set-top boxes are tuned to the second program than are tuned to the first program; and
dynamically increasing the second size of the second shape based on more of the set-top boxes being tuned to the second program than are tuned to the first program at the second point in time.

16. The method of claim 15, where providing the program guide includes:
    providing the program guide as a sidebar or scroll bar on the display while the first program, the second program, or another program of the group of programs is being provided by the set-top box to the display.

17. The method of claim 15,
where the first program guide information includes:
    information indicating a program category associated with the first program, and
where providing the program guide includes:
    causing the first shape to be grouped, in the program guide, with one or more other shapes that represent one or more other programs, of the group of programs, that are associated with the program category.

18. The method of claim 15,
where the first program guide information includes:
information indicating a source category associated with the first program, and
where providing the program guide includes:
causing the first shape to be grouped, in the program guide, with one or more other shapes that represent one or more other programs, of the group of programs, that are associated with the source category.

19. The method of claim 15,
where the first program guide information includes information identifying one or more geographic regions, and
where providing the program guide includes:
causing the first shape to be grouped, in the program guide, based on the information identifying the one or more geographic regions.

20. The system of claim 14, where the second program guide information is used by the particular set-top box to dynamically increase or decrease, based on the different quantity indicator, the first size of the first shape that represents the particular program in the program guide.

21. The system of claim 14,
where the quantity indicators further include a different quantity indicator that represents, for the different program a third quantity of set-top boxes, of the plurality of set-top boxes, that are tuned to the different program at the first point in time, and
where the updated quantity indicators further include a different updated quantity indicator that represents, for the different program a fourth quantity of set-top boxes, of the plurality of set-top boxes, that are tuned to the different program at the second point in time.

22. The system of claim 14, where providing the first program guide information includes:
providing two or more of:
an image associated with the particular program,
information indicating a time period when the particular program airs,
a program category associated with the particular program, or
a source category associated with the particular program.

* * * * *